United States Patent
Ma et al.

(10) Patent No.: US 12,366,868 B2
(45) Date of Patent: Jul. 22, 2025

(54) SYSTEMS FOR AND METHODS OF POSITIONING SOLAR PANELS IN AN ARRAY OF SOLAR PANELS WITH SPECTRALLY ADJUSTED IRRADIANCE TRACKING

(71) Applicant: Nextracker LLC, Fremont, CA (US)

(72) Inventors: Yudong Ma, Richmond, CA (US); Francesco Borrelli, Kensington, CA (US); Yang Liu, Mountain View, CA (US); Allan Daly, Albany, CA (US)

(73) Assignee: NEXTRACKER LLC, Fremont, CA (US)

( * ) Notice: Subject to any disclaimer, the term of this patent is extended or adjusted under 35 U.S.C. 154(b) by 0 days.

(21) Appl. No.: 18/430,290

(22) Filed: Feb. 1, 2024

(65) Prior Publication Data

US 2024/0231397 A1 Jul. 11, 2024

Related U.S. Application Data

(63) Continuation of application No. 17/268,939, filed as application No. PCT/US2019/048665 on Aug. 28, 2019, now Pat. No. 11,914,404.
(Continued)

(51) Int. Cl.
*G05D 3/10* (2006.01)
*G01S 3/786* (2006.01)
(Continued)

(52) U.S. Cl.
CPC ............ *G05D 3/105* (2013.01); *G01S 3/7861* (2013.01); *H02S 20/32* (2014.12); *H02S 40/38* (2014.12); *G01W 1/00* (2013.01)

(58) Field of Classification Search
CPC ....... G05D 3/105; G01S 3/7861; H02S 20/32; H02S 40/38; H02S 10/00; G01W 1/00;
(Continued)

(56) References Cited

U.S. PATENT DOCUMENTS 8,466,399 B1 6/2013 Sherman
9,677,809 B1 6/2017 Eustis
(Continued)

FOREIGN PATENT DOCUMENTS

CN 102326034 A 1/2012
CN 103003818 A 3/2013
(Continued)

OTHER PUBLICATIONS

Nextracker, news release "NEXTracker Announces TrueCapture™, . . . ", [online], published on Jul. 11, 2017, [retrieved on Jan. 5, 2023], retried from <https://www.nextracker.com/2017/07/nextracker-announces-truecapture-a-revolutionary-intelligent-control-system-for-solar-power-plants/> (Year: 2017).*

(Continued)

*Primary Examiner* — Charles Cai
(74) *Attorney, Agent, or Firm* — Fredrikson & Byron, P.A.

(57) ABSTRACT

A solar tracking system comprises multiple solar panel modules forming a grid of solar panel modules, wherein the multiple solar panel modules are movable relative to a solar source independently of each other; and a control system configured to orient each of the multiple solar panel modules to the solar source independently of each other based on a performance model to optimize an energy output from the grid of solar panel modules, wherein the performance model predicts an energy output from the grid of solar panel modules based on a topography of the area containing the
(Continued)

grid of solar panel modules and weather conditions local to each of the solar panel modules.

20 Claims, 23 Drawing Sheets

Related U.S. Application Data

(60) Provisional application No. 62/723,915, filed on Aug. 28, 2018.

(51) Int. Cl.
*G01W 1/00* (2006.01)
*H02S 20/32* (2014.01)
*H02S 40/38* (2014.01)

(58) Field of Classification Search
CPC .. F24S 50/40; F24S 50/20; F24S 50/60; F24S 50/80; Y02E 10/47; Y02E 10/50; Y02E 70/30
See application file for complete search history.

(56) References Cited

U.S. PATENT DOCUMENTS

| | | | |
|---|---|---|---|
| 2010/0170559 A1* | 7/2010 | McGlynn | H01L 31/0543 136/246 |
| 2010/0198420 A1 | 8/2010 | Rettger et al. | |
| 2011/0178641 A1 | 7/2011 | Judkins | |
| 2011/0308512 A1 | 12/2011 | Nakasato et al. | |
| 2012/0004780 A1 | 1/2012 | Miller et al. | |
| 2012/0035887 A1 | 2/2012 | Augenbraun et al. | |
| 2012/0049855 A1 | 3/2012 | Crites | |
| 2012/0065788 A1 | 3/2012 | Harper, III et al. | |
| 2012/0154162 A1 | 6/2012 | Vandevelde et al. | |
| 2012/0174964 A1* | 7/2012 | Lin | G05D 3/12 136/246 |
| 2012/0191351 A1 | 7/2012 | Kerrigan et al. | |
| 2013/0269754 A1 | 10/2013 | Judkins | |
| 2014/0196761 A1 | 7/2014 | Tilley et al. | |
| 2015/0177415 A1 | 6/2015 | Bing | |
| 2015/0331972 A1 | 11/2015 | Mcclure et al. | |
| 2015/0377518 A1 | 12/2015 | Maxey et al. | |
| 2016/0179994 A1 | 6/2016 | Levine et al. | |
| 2017/0070187 A1 | 3/2017 | Jain et al. | |
| 2017/0356609 A1 | 12/2017 | Gelbaum | |
| 2018/0152134 A1* | 5/2018 | Arliaud | F24S 30/425 |
| 2019/0334934 A1* | 10/2019 | Teshome | H04W 12/106 |
| 2020/0011731 A1* | 1/2020 | Siddiqui | H02J 3/004 |
| 2021/0003308 A1* | 1/2021 | Venne | G05B 19/042 |

FOREIGN PATENT DOCUMENTS

| | | |
|---|---|---|
| CN | 103472858 A | 12/2013 |
| CN | 106026882 A | 10/2016 |
| CN | 106502274 A | 3/2017 |
| CN | 111448431 A | 7/2020 |
| EP | 2509010 A1 | 10/2012 |
| WO | 2017001791 A1 | 1/2017 |
| WO | 2017193153 A1 | 11/2017 |
| WO | 2019010387 A1 | 1/2019 |

OTHER PUBLICATIONS

Nextracker, Inc. NEXTracker Announces TrueCapture , a Revolutionary Intelligent Control System for Solar Power Plants, company website, Jul. 11, 2017. [retrieved on Oct. 21, 2019]. Retrieved from internet: entire article and video.
Transcript for "TrueCapture Solar Tracker Control System Boosts Power Production" published Jul. 8, 2017 (5 pages). (https://www youtube.comAvatch?v=iQoOCmYjX4U&t=6s, last visited Apr. 13, 2023).
PCT Search Report and Written Opinion issued in PCT Application No. PCT/US2019/048665 dated Nov. 21, 2029, 21 pages.
Animation: TrueCapture Solar Tracker Control System Boosts Power Production [Viewed on internet on Jun. 23, 2022] < URL:https:// www.youtube.com/watch?v=iQoOCmYjX4U&t=6s >, Published Jul. 8, 2017.
Examination Report issued in Indian Patent Application No. 202117006805 dated Nov. 17, 2022, 6 pages.
Extended European Search Report issued in European Application No. 19856132.6 dated Jan. 3, 2022, 8 pages.
Examination Report issued in Australian Patent Application No. 2019327453 dated Dec. 15, 2021, 4 pages.
Examination Report issued in Australian Patent Application No. 2019327453 dated Mar. 3, 2022, 5 pages.
Examination Report issued in Australian Patent Application No. 2019327453 dated Oct. 28, 2021, 4 pages.
Examination report No. 4 issued in Australian Patent Application No. 2019327453 dated Jun. 29, 2022.
Examination report No. 5 issued in Australian Patent Application No. 2019327453 dated Aug. 19, 2022.
Examination report No. 6 issued in Australian Patent Application No. 2019327453 dated Oct. 19, 2022.
Jeffrey R S. Brownson, "New Energy Technology Translations Solar Energy Conversion System," (US), pp. 183-186, Beijing, China Three Gorges Press, Dec. 2016. English translation not available but the English language version of the Second Office Action Issued by China National Intellectual Property Administration, which is cited herein, explains and/or quotes the relevant portions of this NPL at pp. 2, 7, 9, and 12-14.
Dirnberger, D., "Uncertainties in Energy Rating for Thin-film PV Modules", Thesis, Carl von Ossietzky University of Oldenburg, Sep. 2015, pp. 176.

* cited by examiner

Using the other side: reconstruct the order

Assuming the reading is as follows: spc_i in physical position
[6 3 4 1 2 5]

The final event list (in degree)
[6 3 4 1 2 5]
β-event1 (morning): [63.65  66.60  67.85  69.05  69.30   NaN]
β-event2 (afternoon): [−66.60 −64.00 −64.25 −69.70  NaN  −65.40]

Then we Have:

DH_est1=[−0.2492  0.0011  0.1038  0.2006  0.2206   NaN]
DH_est_2=[0.0011  0.2189  0.1973 −0.2524  NaN  0.0993]

Reconstructed order: [6 3 4 1 2 5]
(Can reconstruct order by depth-first switch&match algorithm - implemented in Matlab)

Random (order and DH) examples:

| Test # | Number of rows | Estimation Error (m) | Number of moves to estimate order (worst case) | Max DH |
|---|---|---|---|---|
| 1 | 30 | 0.0018 | 3 | 0.3 |
| 1 | 30 | 0.0018 | 0 | 0.3 |
| 1 | 30 | 0.0012 | 0 | 0.3 |
| 1 | 30 | 0.0015 | 3 | 0.3 |
| 1 | 30 | 0.0016 | 0 | 0.3 |
| 1 | 30 | 0.0015 | 0 | 0.5 |
| 1 | 30 | 0.0016 | 0 | 0.5 |

FIG. 16

Random (order and DH) Examples:

| Test # | Number of rows | Estimation Error (m) | Number of moves to estimate order (worst case) | Max DH |
|---|---|---|---|---|
| 1 | 30 | 0.0011 | 10 | 0.1 |
| 1 | 30 | 0.0009 | 21 | 0.1 |
| 1 | 30 | 0.0011 | 8 | 0.1 |
| 1 | 60 | 0.0017 | 5 | 0.3 |
| 1 | 60 | 0.0016 | 0 | 0.3 |
| 1 | 60 | 0.0018 | 4 | 0.3 |
| 1 | 60 | 0.0016 | 0 | 0.5 |

FIG. 17

Simple Recursive Algorithm

```
estimated_order = zeros(1,plant.N)
[estimated_order,estimated_dh] = order_dh_estimation_v3 (estimated_order,[],NaN,1);

function [out_list, dh_list] = order_dh_estimation(in_list,dh_list,marker,jglobal)
global deltaH_est1 deltaH_est2 plant %% find elements with marker or close to marker
if jglobal==1,
   Nlist=1:plant.N;
   reconstructed_position_sensor=Nlist(isnan(deltaH_est1));
elseif isnan(marker);
   out_list=[];
   if sum(in_list)==sum(1:plant.N)
      out_list=[out_list;in_list];
   end
   return
else
   % find corresponding element
   [sorted,j_sorted]=sort(abs(deltaH_est1-marker));
   reconstructed_position_sensor=j_sorted(sorted<0.009);
end
nt=length(reconstructed_position_sensor);
if nt>=1,
out_list=[];
   for k=1:nt
      if ~ismember(reconstructed_position_sensor(k),in_list), %%remove
      elements already explored
         temp=in_list;
         temp(jglobal)=reconstructed_position_sensor(k);
         marker=deltaH_est2(reconstructed_position_sensor(k));
         [out_list_temp,dh_list] = order_dh_estimation_v2(temp,dh_list,
         marker,jglobal+1);
         out_list=[out_list;out_list_temp];
      end
   end
else
   out_list=[];
end
end
```

FIG. 18

Sensitivity Beta-event to DH estimation

Recall: $f(\theta_1, \theta_2, \beta, \iota, dh) = 0$

Sensitivity: $\left. \dfrac{\partial dh}{\partial \beta} \right|_{\iota=0, \beta=\bar{\beta}, dh=\bar{dh}, \theta_1=\bar{\theta}_1, \theta_1=\bar{\theta}_2}$ Value: ~0.08 → 1 deg error in beta corresponsts to 8 cm error in dh Quantization of 0.05 beta deg (10 sec) corresponds to quantization of 4mm in dh

FIG. 20

SYSTEMS FOR AND METHODS OF POSITIONING SOLAR PANELS IN AN ARRAY OF SOLAR PANELS WITH SPECTRALLY ADJUSTED IRRADIANCE TRACKING

RELATED APPLICATIONS

This application is a continuation of U.S. patent application Ser. No. 17/268,939 filed Feb. 16, 2021, which is a 371 National Stage application of PCT/US2019/048665 filed on Aug. 28, 2019, which claims the benefit of U.S. Provisional Patent Application No. 62/723,915 filed on Aug. 28, 2018, the entire contents of each of which are incorporated herein by reference.

TECHNICAL FIELD

This present disclosure is related to energy conversion systems. More particularly, this present disclosure is related to controlling solar tracking systems to efficiently capture solar radiation for conversion to electrical energy.

BACKGROUND

With the increasing recognition of the environmental affects and associated costs of burning fossil fuels, solar energy has become an attractive alternative. Solar tracking systems track the trajectory of the sun to more efficiently capture radiation, which is then converted to electrical energy. Solar tracking systems are less efficient when weather conditions change or when they do not account for local topographies that reduce the amount of light captured.

SUMMARY

In accordance with the principles of the present disclosure, a solar tracking system is controlled by a global performance model based on the weather and topography local to the solar tracking system and of the spectral response of the photovoltaic technology used by the solar panels that comprise the solar array.

One aspect of the present disclosure is directed a solar tracking system including: multiple rows of rotatable solar tracking modules forming a grid of solar modules, where the multiple rows of rotatable solar panel modules are movable relative to a solar source independently of each other. The solar tracking system also includes a control system configured to orient each of the multiple rows of solar panel modules to the solar source independently of each other based on a performance model to optimize an energy output from the grid of solar panel modules, where the performance model predicts an energy output from the grid of solar panel modules based on an orientation of each of the multiple rows of solar panel modules to the solar source and first data including weather conditions local to each of the multiple rows of solar panel modules. Other embodiments of this aspect include corresponding computer systems, apparatus, and computer programs recorded on one or more computer storage devices, each configured to perform the actions of the methods.

Implementations may include one or more of the following features. The solar tracking system where the control system moves one or more of the multiple rows of solar panels to a position where it generates less than the maximum energy it could in consideration of the instant position of the sun. The solar tracking system where the position of the one or more multiple rows of solar panels is determined to eliminate shading of the multiple rows of solar panels. The solar tracking system where the control system includes a self-powered controller. The solar tracking system where the control system further includes at least one network control unit in wireless communication with at least one of the multiple rows of rotatable solar modules. The solar tracking system where the control system further includes a plurality of network control units each in wireless communication with at least one of the multiple rows of rotatable solar modules, the plurality of network control units in communication with each other and forming a mesh network. The solar tracking system where the control system further includes a plurality of self-powered controllers (SPC) and a plurality of network control units (NCU) in wireless communication with each other, the SPCs providing the NCUs real time information regarding shading experienced by the SPCs. The solar tracking system further including a remote host, where the remote host receives communications from the control system. The solar tracking system where the remote host retrieves weather data and generates a performance model. The solar tracking system where the performance model is based on one or more of direct normal irradiance (DNI), global horizontal irradiance (GHI), or diffuse horizontal irradiance (DHI). The solar tracking system where the performance model is based on the topology of the grid of solar modules. The solar tracking system where the weather includes forecasted weather and instantaneous weather. The solar tracking system where the performance model is executed by a supervisory control and data acquisition (SCADA) device. The solar tracking system where the SCADA includes a topology module of the grid of solar modules. The solar tracking system where the SCADA includes a row-to-row tracking module configured track the slope of solar panel modules at their locations. The solar tracking system where the row-to row tracking module is in communication with a diffuse angle adjustor and sends target tracking angles data to the diffuse angle adjustor. The solar tracking system where the SCADA includes a DHI-GHI module. The solar tracking system further including a weather look-up module, the weather look-up module in communication with the DHI-GHI module and providing weather data to the DHI-GHI module and the diffuse angle adjustor. The solar tracking system where the diffuse angle adjustor is in communication with an SPC. The solar tracking system where the SCADA further includes a local sensor data module in communication with an NCU local sensor to provide local sensor data from the grid of solar modules. Implementations of the described techniques may include hardware, a method or process, or computer software on a computer-accessible medium.

BRIEF DESCRIPTION OF THE DRAWINGS

The following figures are used to illustrate embodiments of the present disclosure. In all the figures, the same label refers to the identical or a similar element.

FIGS. 10-23 show algorithms and results of using the algorithm to determine relative heights in accordance with one embodiment of the present disclosure.

DETAILED DESCRIPTION

The present disclosure is related to PCT/US2018/41045 entitled "SYSTEMS FOR AND METHODS OF POSITIONING SOLAR PANELS IN AN ARRAY OF SOLAR PANELS TO EFFICIENTLY CAPTURE SUNLIGHT," filed Jul. 6, 2018, the entire contents of which are incorporated herein by reference.

A solar tracking system in accordance with the principles of the present disclosure more efficiently captures radiance for conversion to electrical energy. It will be appreciated that for large energy-generating systems, such as those generating hundreds of megawatts, a small percentage gain in efficiency translates to large gains in energy output.

In accordance with one embodiment, a solar tracking system comprising individual rows of solar panel modules adjusts each row independently of the others to provide more finely tuned tracking and efficiently captures diffuse radiation to increase the total energy output by the system. Preferably, the solar tracking system is based on a performance model that is periodically tuned based on learning algorithms that compare predicted values (e.g., radiance incident on the solar panels or output generated at the solar panels) to the actual values and updates the performance model accordingly. In one embodiment, the performance model is generated by plotting weather conditions (e.g., ratios of diffuse fraction index to optimal diffuse gain or ratios of diffuse radiance to direct radiance) and fitting a curve (the performance model) to the data using regression. In another embodiment, this data is stored in a diffuse table.

Figure 1:
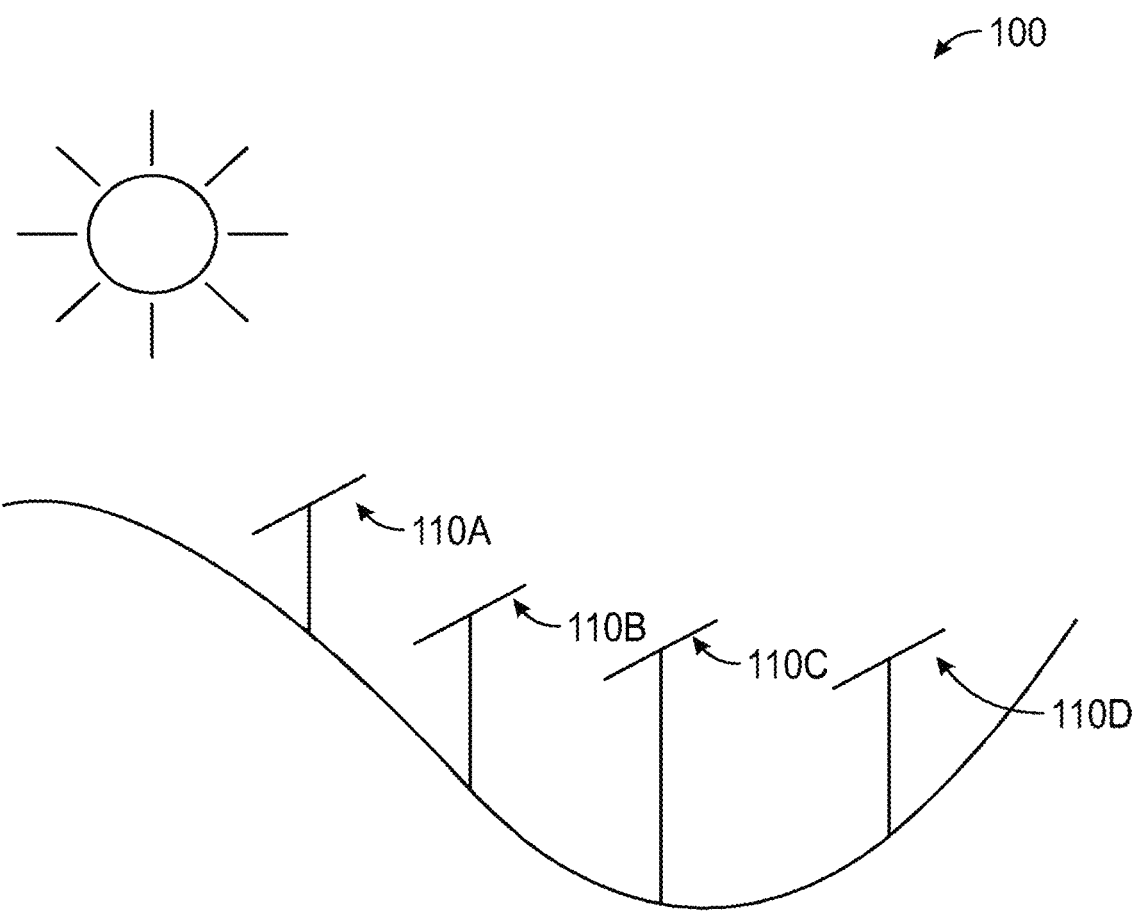
FIG. 1 shows a portion of a solar tracking system including multiple rows of solar panel modules.

FIG. 1 shows a portion of a solar tracking system 100 including multiple solar panels 110A-D forming a grid of solar panel modules, used to explain the principles of the present disclosure. Each of the solar panel modules 110A-D has a light-collecting surface for receiving solar radiation, which is later converted into electricity for storage in a battery and for distribution to a load. Embodiments of the present disclosure determine a performance model, predicting the output of the grid, used to orient each of the rows of solar panel modules to the sun or other radiation source to optimize the total energy output from the grid. Preferably, the performance module is determined from a topography of the area containing the grid, local weather conditions for each of the solar panel modules, or both. As one example, the performance model accounts for dependencies (coupling) between the rows (adjacent and otherwise) of solar panels. For example, if the row of solar panel modules 110A shades or partially shades the row of solar panel modules 110B, the two are said to be coupled. In other words, due to shading at a particular time of day or other relationships between the rows 110A and 110B, maximizing the global energy output by the entire grid does not necessarily correspond to maximizing the energy output by the row 110A and 110B. Instead, the global energy output might be maximized by coordinating the outputs, such as by orienting the row 110A to generate 80% of its maximum and the row 110B to generate 10% of its maximum. The performance model determines these coefficient or gains (and thus the orientation angles to the sun) for each of the all the rows in the system 100, including the rows 110A and 110B.

As used herein, in one embodiment, "orient" means to change an angle between the normal to a solar panel module and the line to the sun (the "incident angle"), to change any combination of x-y-z coordinates of a solar panel module with respect a fixed location (e.g., GPS location), to rotate the solar panel module along any of the x-y-z coordinate axes, or any combination of these. After reading this disclosure, those skilled in the art will recognize other ways to orient a row of solar panel modules to change an amount of radiation impinging on it and converted to electrical energy.

Figure 2:
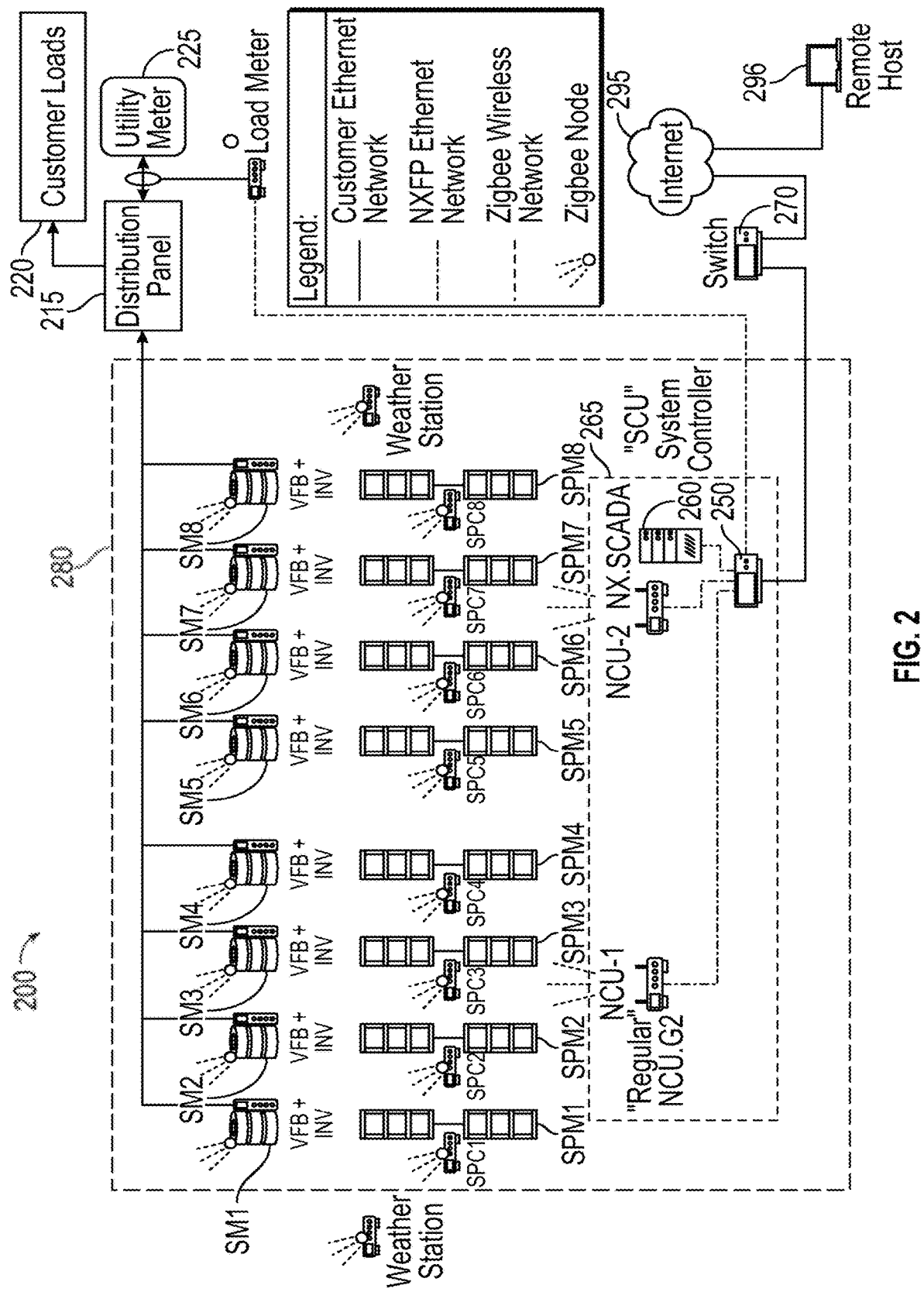
FIG. 2 shows a solar tracking system in accordance with one embodiment of the present disclosure.

FIG. 2 shows a solar tracking system 200 in accordance with one embodiment of the present disclosure. The solar tracking system 200 is a distributed peer-to-peer network. The solar tracking system 200 includes multiple rows of solar panel modules (SPMs) $SPM_1 \ldots SPM_{1\ 8}$, together forming a grid of solar panel modules. Each $SPM_i$ (here i=1 to 8, though other values are contemplated) is coupled to a corresponding self-powered controller ($SPC_i$) and drive assembly ($DA_i$, not shown). Each $SPC_i$ has logic for orienting its corresponding drive assembly (DA) and thus $SPM_i$ based on orientation commands. As one example, an $SPC_i$ receives an orientation command from a network control unit (described below) to orient an incident angle θi between the $SPM_i$ and the sun. The corresponding drive assembly $DA_i$ positions the $SPM_i$ to the angle θi. Each of the rows $SPM_i$ is able to be oriented independently of the other rows.

Each of the rows of solar panel modules $SPM_i$ receives light, converts the light into electricity, and stores the electricity in a corresponding data storage medium, $SM_i$, for i=1 to 8. The storage media $SM_1 \ldots SM_8$ are ganged together and electrically coupled through a distribution panel 215 to customer loads 220. Network control units (NCU) $NCU_1$ and $NCU_2$ are each wirelessly coupled to one or more of the SPMs. As shown in FIG. 1, $NCU_1$ is wirelessly coupled to SPCs $SPC_1$ to $SPC_4$ and $NCU_2$ is wirelessly coupled to SPCs $SPC_5$ to $SPC_8$ $NCU_1$ and $NCU_2$ are both coupled over an Ethernet cable to an NXFP switch 250. The switch 250 couples $NCU_1$ and $NCU_2$ to a NX Supervisory Control and Data Acquisition (SCADA) 260, which in turn is couple to a switch 270 coupled to a remote host 296 over a network such as a cloud network. In some embodiments, the remote host 296 performs processing such as generating performance models, retrieving weather data, to name only a few such tasks. For ease of reference, the combination of $NCU_1$, $NCU_2$, NX SCADA 260 and NXFP switch 250 is referred to as an "SCU" system controller 265. Together, the components enclosed by the dotted line 280 are collectively referred to as "grid" or "zone" 280.

Preferably, each NCU in the zone 280 is coupled to each of the remaining NCUs in the zone 280, thereby forming a mesh architecture. Thus, if for any reason $NCU_1$ loses communication to the NX SCADA 260, $NCU_1$ can communicate with the NX SCADA 260 through $NCU_2$. In other words, each NCU in the zone 280 acts as a gateway to the NX SCADA 260 for any other NCU in the zone 280. This added redundancy provides a fail-safe network. In one embodiment, the NCUs in the zone 280 are wirelessly coupled to each other.

Each NCU in the zone 280 has added functionality. As some examples, the NCUs in the zone 280 together ensure that the performance model is globally optimized and the components in the zone 280 are operating properly. If, for example, $SPC_1$ instructs $NCU_1$ that it is shaded but, according to the performance model $SPC_1$ should not be shaded, the $NCU_1$ determines that an error has occurred. Each SPC also informs its associated NCU when it has changed its orientation. Using this information, the NCUs can thus keep track of the orientations of the solar panel modules $SPM_i$.

In accordance with one embodiment, if a row of solar panel modules suffers catastrophic failure and cannot communicate with its associated SCADA, the solar panel module enters a default mode. As one example, in default mode, an $SPM_i$ optimizes its energy conversion independently of the energy conversion for the entire grid.

It will be appreciated that FIG. 2 has been simplified for ease of illustration. In other embodiments, the zone 280 contains fewer, but preferably more, than 8 SPMs and 2 NCUs. In one embodiment, the ratio of SPCs to NCUs is at least between 50:1 to 100:1. Thus, as one example, during normal operation, $NCU_1$ communicates with $SPC_1$ through $SPC_{50}$, $NCU_2$ communicates with $SPC_{51}$ to $SPC_{100}$, etc.

In operation, a performance model is generated for each of the solar panel modules, based on the topography of the area containing a particular solar panel module, the weather local to the particular solar panel module, or both. In one embodiment, the weather comprises amounts of direct light, amounts of direct normal irradiance (DNI), global horizontal irradiance (GHI), diffuse horizontal irradiance (DHI), any combination of these, ratios of any two of these (e.g., DHI/GHI), or any function of these. After reading this disclosure, those skilled in the art will recognize functions of DNI, GHI, and DHI that can be used to generate performance models in accordance with the principles of the present disclosure. By fitting the weather conditions to output, a base performance model is determined using regression or other curve-fitting techniques. It will be appreciated that each SPM has its own performance model, based, among other things, on its topography and local weather conditions. As explained below, each base performance model is then updated based on diffuse fraction sky.

As one example, the parameters of the base performance model are pushed to an SPC associated with a solar panel module $SPM_i$. These parameters reflect an orientation for a solar panel module if no adjustments based on "diffuse fraction" sky were needed. To account for diffuse radiation, parameters based on the diffuse angle adjustment are also sent to the particular $SPC_i$. As one example, the parameters for a base performance model indicate that, for global optimization of the performance model, a solar panel module should be oriented at an incidence angle of 10 degrees. Diffuse angle adjustor data indicate that 10 degrees is not optimal for this SPM, but instead 70% (a factor of 0.7) of this angle should be used. Thus, the diffuse angle adjustor (gain factor) of 0.7 is pushed to the particular solar panel. When the particular SPC receives both parameters, it orients its associated solar panel to an incidence angle of (0.7)*(10 degrees)=7 degrees. Preferably, the diffuse angle adjustment is performed periodically, such as once every hour, though other periods are able to be used.

Some embodiments of the present disclosure avoid shading in the morning, by using backtracking. The performance model thus generates some gains (e.g., target angles for orienting an SPM) for early morning tracking (to avoid shading) and another gain for other times. The system in accordance with these embodiments are said to operate in two modes: regular tracking and backtracking. That is, the system uses a backtracking algorithm (performance model) at designated times in the early morning and a regular tracking algorithm at all other times.

The performance model differentiates between forecasted weather and instantaneous weather. For example, an instantaneous change in weather (e.g., a momentary drop in radiance) may be attributable to a passing cloud rather than an actual change in weather. Thus, preferably the performance model gives more weight to forecasted weather.

Figure 3:
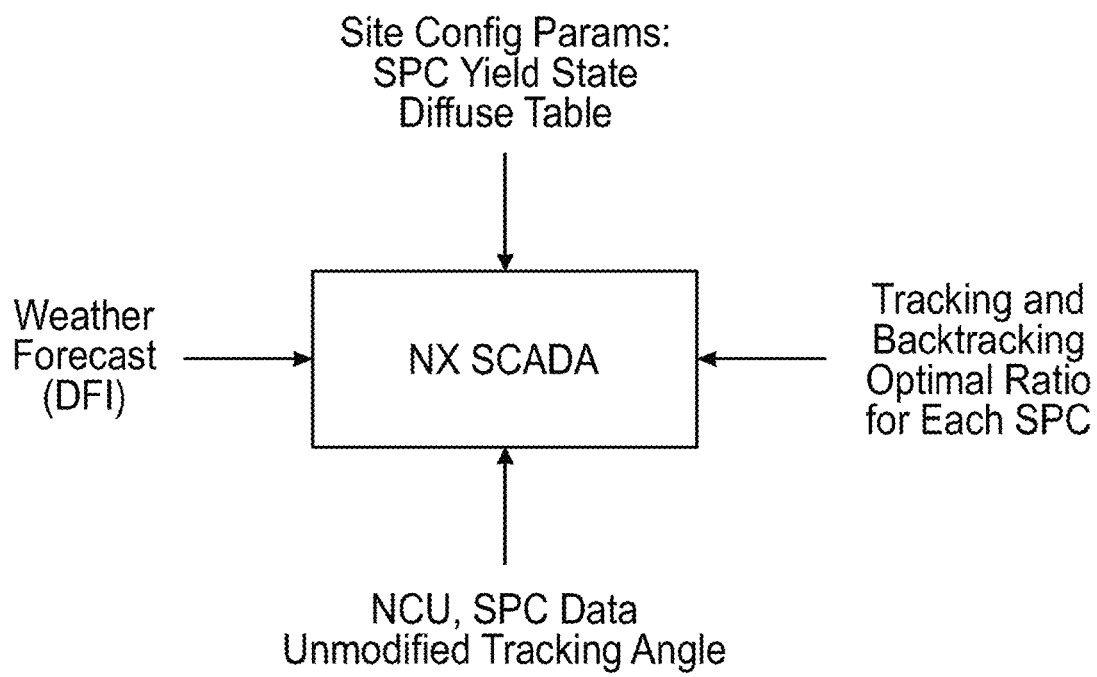
FIG. 3 is a block diagram of a diffuse control architecture NX Supervisory Control and Data Acquisition (SCADA) in accordance with one embodiment of the present disclosure.

FIG. 3 is a block diagram of a diffuse control architecture NX SCADA 300 in accordance with one embodiment of the present disclosure. The NX SCADA 300 receives as input weather forecast (e.g., DFI), NCU and SPC data (unmodified tracking angle), site configuration parameters (e.g., SPC Yield state and Diffuse table) and outputs tracking and backtracking optimal ratios for each SPC. A diffuse table in accordance with one embodiment of the present disclosure plots optimal diffuse gain versus diffuse fraction indexes for determining a performance model.

Figure 4:
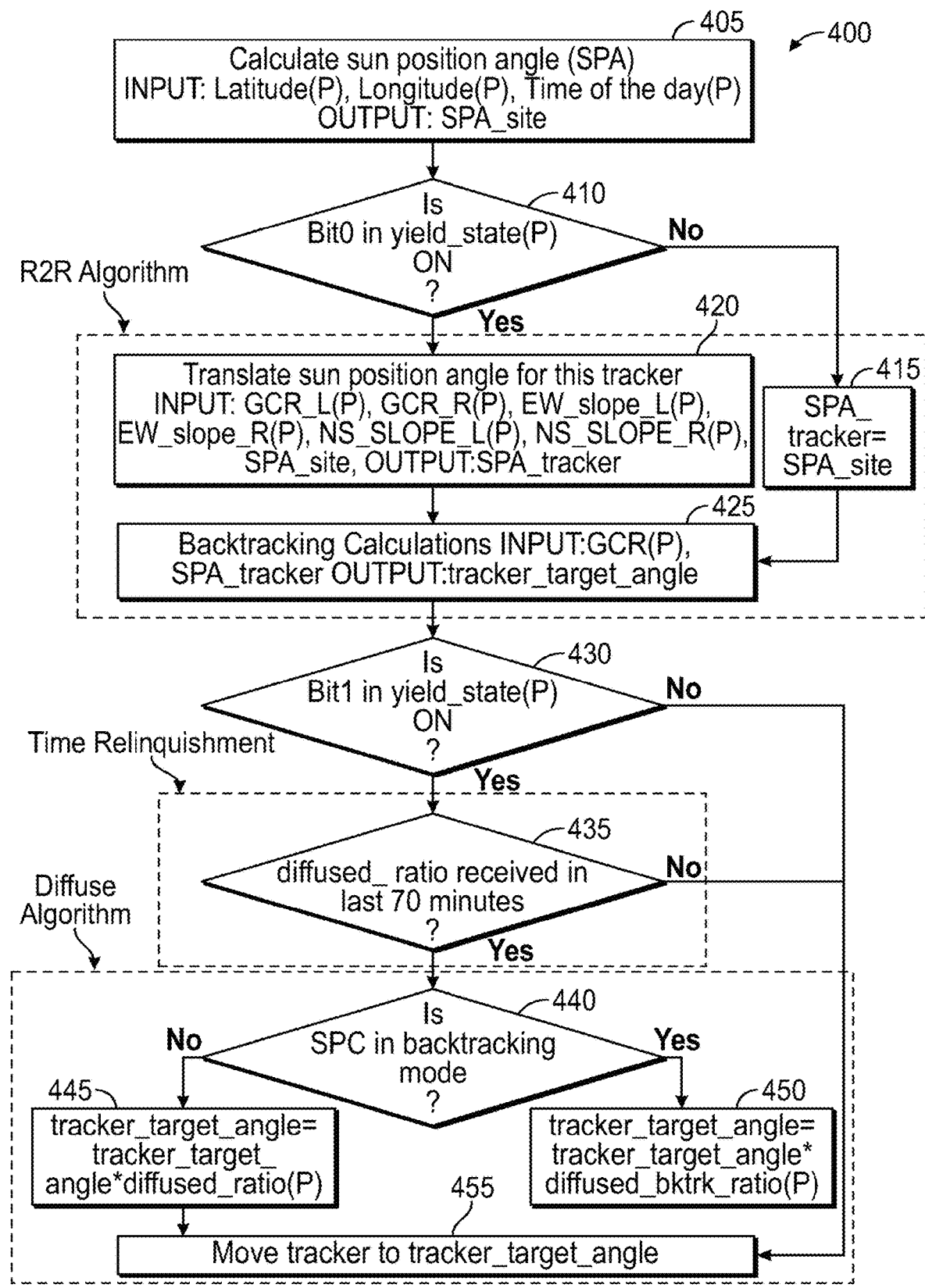
FIG. 4 shows the steps of a process, an enhanced tracking algorithm, for determining parameters of a global optimal performance model for a solar grid in accordance with one embodiment of the present disclosure.

FIG. 4 shows the steps 400 of a process for determining parameters for performance models in accordance with one embodiment of the present disclosure. Though the process is performed for each row of solar panels in a grid, the following explanation describes the process for a single row of solar panel modules in a grid. It will be appreciated that the process will be performed for the remaining rows of solar panel modules. First, in the step 405, the sun position angle (SPA) is calculated from the latitude and longitude for the particular row of solar panel modules and the time of day. Next, in the step 410, it is determined whether the Bit0 in the yield state is ON. Here, Bit0 and Bit1 are a two-bit sequence (Bit0Bit1) used to describe which of a possible 4 modes the solar tracker is in: Bit0=0/1 corresponds to row-to-row (R2R) tracking being OFF/ON, and Bit1=0/1 corresponds to diffuse tracking being OFF/ON. Thus, for example, Bit0Bit1=01 corresponds to R2R tracking OFF and diffuse tracking ON, Bit0Bit1=10 corresponds to R2R tracking ON and diffuse tracking OFF, etc. In other embodiments, Bit0=1/0 corresponds to R2R tracking being OFF/ON and Bit1=1/0 corresponds to diffuse tracking is OFF/ON. The designations are arbitrary.

If Bit0 is not ON, the process proceeds to the step 415 in which SPA_Tracker is set to the SPA_Site, and continues to the step 425. If, in the step 410, it is determined that the Bit0 in the yield state is ON, then the process continues to the step 420, where the SPA for the tracker is translated, from which the process continues to the step 425. In the step 425, "backtracking" is calculated. From the step 425, the algorithm proceeds to the step 430, in which it is determined whether Bit1 in the yield state is ON. If Bit1 is ON, the process continues to the step 435; otherwise, if Bit1 in the yield state is OFF, the process continues to the step 455.

In the step 435, the process determines whether a diffused ratio has been received in the last 70 minutes. If a diffused ratio has been received in the last 70 minutes, the process continues to the step 440; otherwise, the process continues to the step 455. In the step 440, the process determines whether the particular SPC is in the backtracking mode. If it determined that the SPC is not in the backtracking mode, the process continues to the step 445; otherwise, the process continues to the step 450. In the step 445, the tracker target angle is set to (tracker target angle)*diffused ratio. From the step 445, the process continues to the step 455. In the step 450, the target tracker angle is set to (target tracker angle) *diffused_backtrack_ratio. From the step 455, the process continues to the step 455. In the step 455, the tracker is moved to the target tracker angle.

As shown in FIG. 4, the steps 415, 420, and 425 form the R2R algorithm; the step 435 forms a "time relinquishment" algorithm; and the steps 440, 445, 450, 455 form the diffuse algorithm. In FIG. 4, for the time relinquishment, if no diffuse ratio is received within the last 70 minutes, the ratios are set to 1.

Those skilled in the art will recognize that the steps 400 are merely illustrative of one embodiment of the present disclosure. In other embodiments, some steps can be added, other steps can be deleted, the steps can be performed in different orders, and time periods (e.g., 70 minutes between diffuse adjustments) can be changed.

Figure 5:
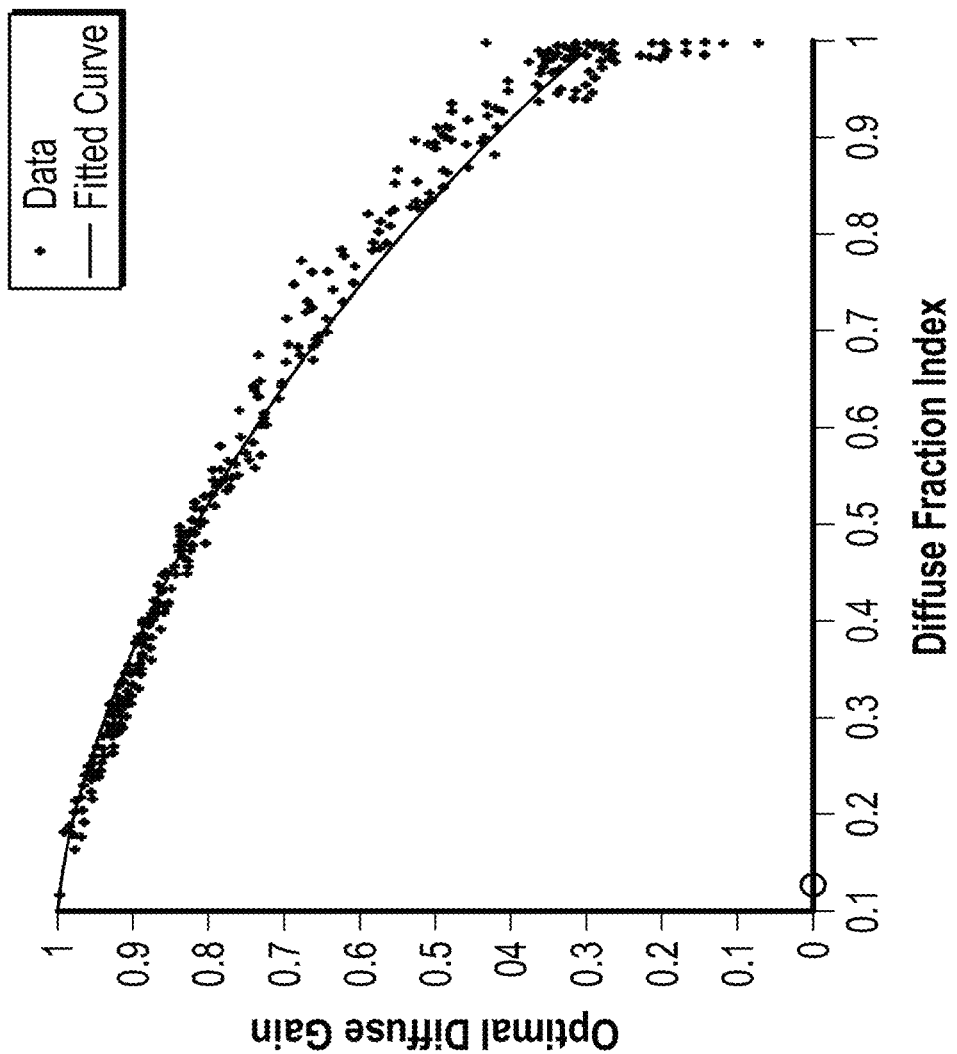
FIG. 5 is a diffuse table generated from yearly data, according to one embodiment of the present disclosure.

FIG. 5 is a diffuse table generated from yearly data, according to one example, plotting optimal diffuse gain versus diffuse fraction index.

Figure 7:
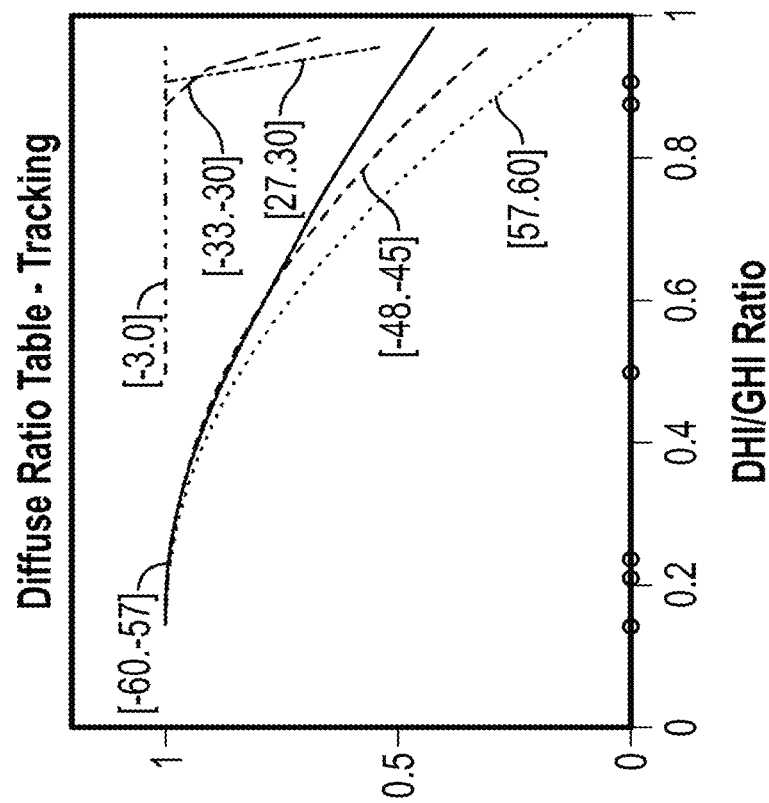
FIG. 7 is a graph of diffuse ratio table backtracking, plotting tracker angle ratio coefficients versus DHI/GHI ratios, according to one embodiment of the present disclosure.
Figure 6:
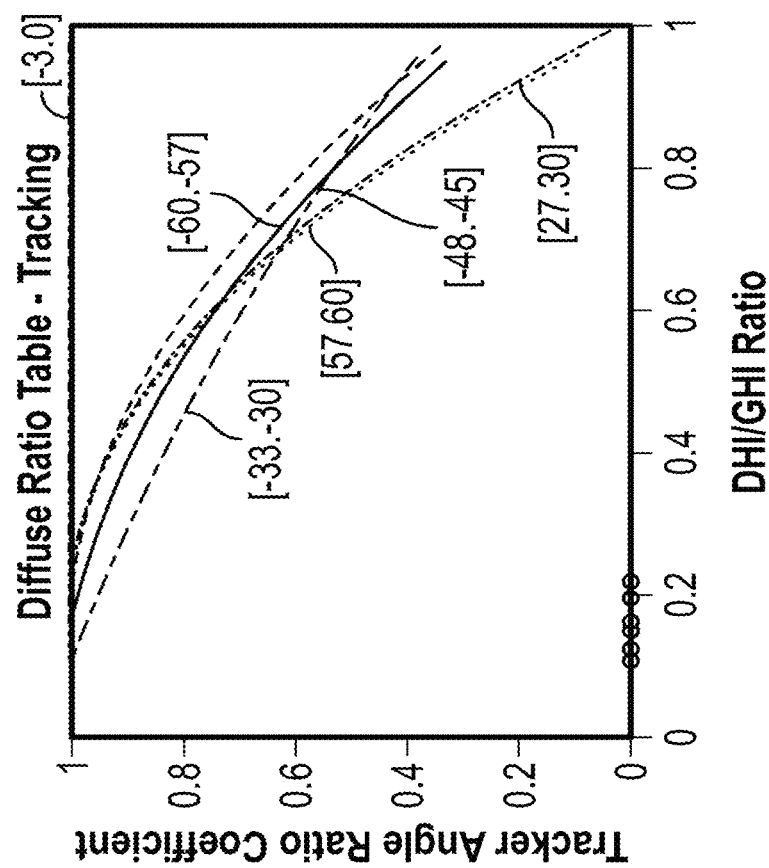
FIG. 6 is a graph of diffuse ratio table tracking, plotting tracker angle ratio coefficients versus DHI/GHI ratios, according to one embodiment of the present disclosure.

FIG. 6 is a graph of a final diffuse ratio table for tracking, plotting tracker angle ratio coefficient versus DHI/GHI ratios, according to one embodiment of the present disclosure. FIG. 7 is a graph of a final diffuse ratio table for backtracking, plotting tracker angle ratio coefficient versus DHI/GHI ratios, according to one embodiment of the present disclosure.

Figure 8:
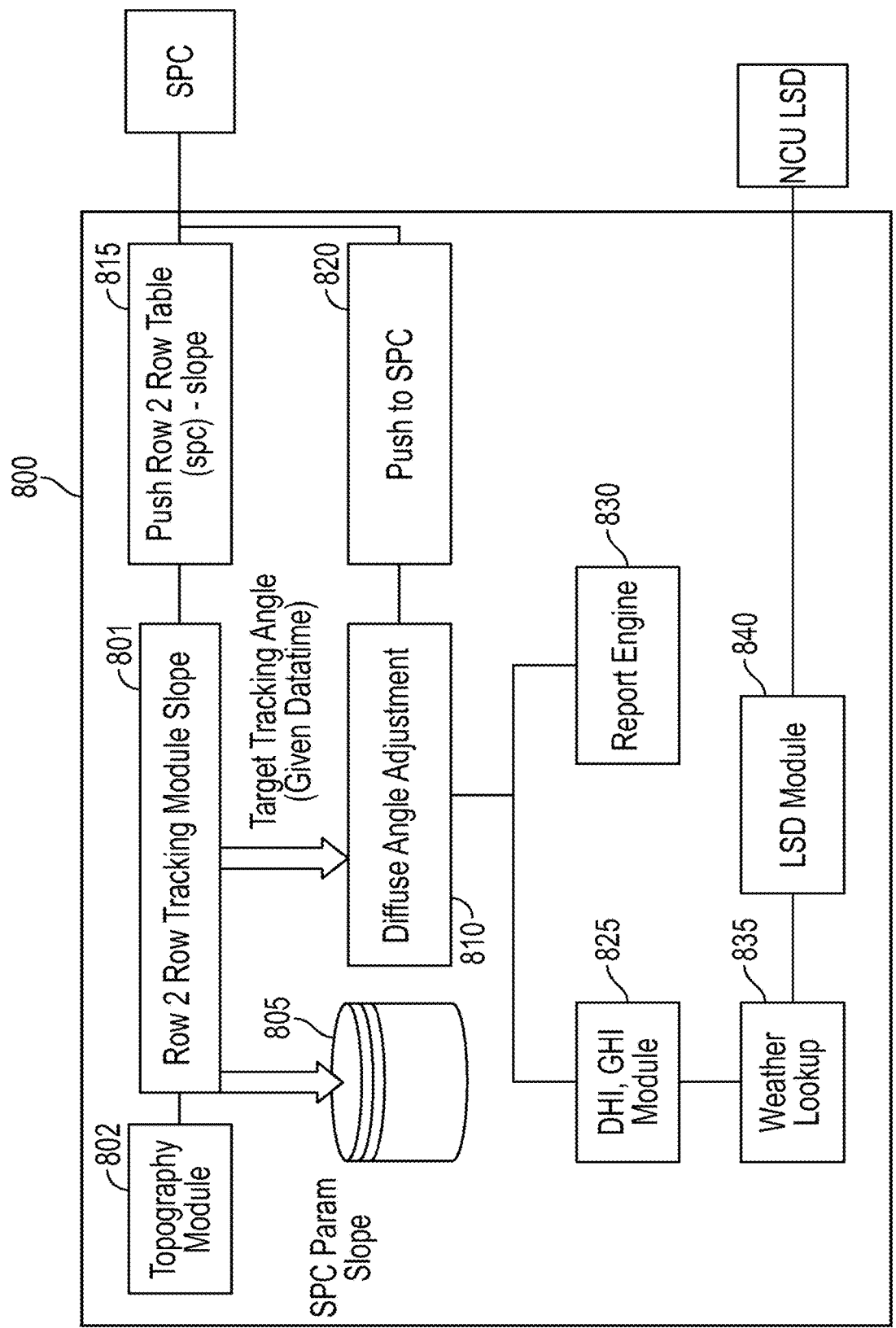
FIG. 8 shows the components of a SCADA system in accordance with one embodiment of the present disclosure.

FIG. 8 shows a SCADA 800 in accordance with one embodiment of the present disclosure. The SCADA 800 comprises a row-to-row (R2R) tracking module 801, storage 805, a diffuse angle adjustor 810, first and second transmission modules 815 and 820, a DHI-GHI module 825, a weather lookup module 835, and a report engine 830. The R2R tracking module 801 is coupled to the storage 805, the diffuse angle adjustor 810, and the first transmission module 815. The R2R tracking module 801 tracks the slopes of solar panel modules at their locations, stores the slopes in the storage 805, sends target tracking angles (for given dates and times) to the diffuse angle adjustor 810, and transmits the slopes to the first transmission module 815 for pushing to the SPCs. The weather lookup module 835 collects weather data for the DHI-GHI module 825, which provides the weather data to the diffuse angle adjustor 810. The diffuse angle adjustor transmits the diffuse angles to the second transmission module 820, which pushes the data to its associated SPC, and also to the report engine 830. The local sensor data (LSD) module 840 receives local sensed weather data (e.g., weather, wind, or other local sensed data) from the NCUs and pushes the data to the weather lookup module 835.

A topography module 802 is configured to store maps and communicate topographical information to the R2R tracking module 801. The information may be used to compute the row-to-row table. It is contemplated that the R2R tracking module 801 may include a topography module 802. The information stored in the topography module 802 may updated on a periodic basis. The topographical information can be determined, for example, using laser site surveys, learned surveys using photovoltaics on SPCs, closed-loop readings on the solar panel modules, or airplane or drone imaging.

As explained above, preferably the SCADA 800 pushes not the "optimal" angle for each individual SPA, but the angle that optimizes the total global energy output. The diffuse angle adjustor 810 pushes not an angle but a ratio (e.g., 70%, a "gain factor"). In a preferred embodiment, SCADA 800 is configured to transmit two gains: a gain for regular tracking and a gain for "backtracking," that is, a gain to avoid shading during early morning hours. Thus, in accordance with one embodiment, the SCADA 800 determines the time of day and thus whether to generate a regular tracking gain or a backtracking gain, which is pushed to the SPCs.

Figure 9:
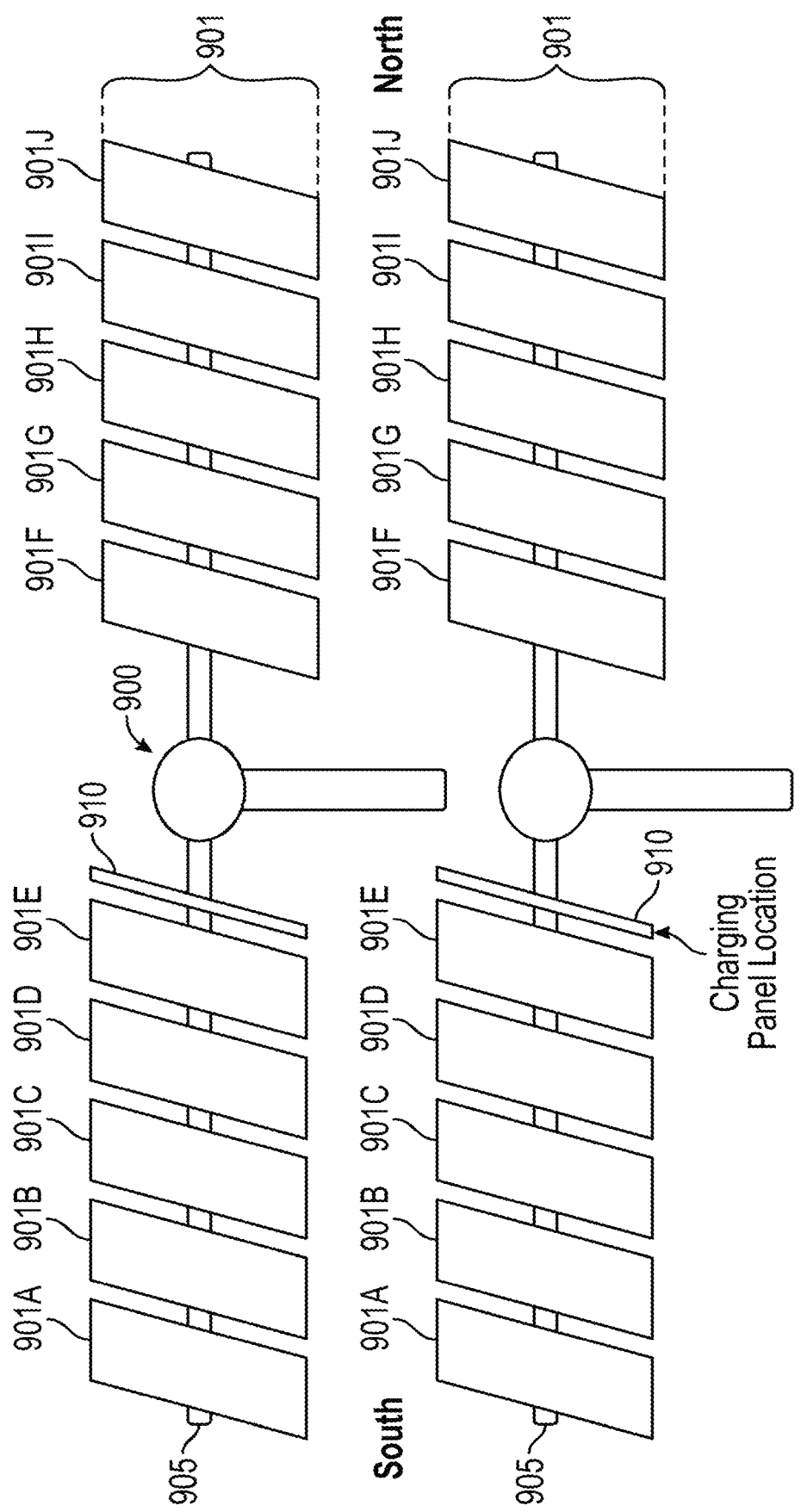
FIG. 9 shows a configuration comprising a row of solar panel modules and a "skinny solar panel" used to determine relative heights of multiple SPMs using shading, in accordance with one embodiment of the present disclosure.

As explained above, in one embodiment a topology for each SPM is determined from shading between SPMs (adjacent and otherwise) using small solar panels ("skinny solar panels") each coupled to or integrated with a self-powered controller (SPC) on an SPM as described above or otherwise coupled to the SPM. As used herein, a skinny solar panel, like individual solar panels in an SPM, is able to read an amount of radiation (e.g., solar radiation) striking its surface. Like an SPM, this amount of radiation is able to be related to an orientation (e.g., incidence angle) of the surface to a solar source. FIG. 9 shows a torque tube supporting both a skinny solar panel 910 and a row of solar panel modules 901, the SPM 901 comprising individual solar panels 901A-J. The torque tube is coupled to a drive assembly (not shown) for orienting (here, rotating) radiation-collecting surfaces of the SPM 901 and the skinny solar panel 910 to the solar source.

It will be appreciated that each of the SPCs, NCUs, and SCADA described herein comprises memory containing computer-executable instructions and a processor for performing those instructions, such as disclosed herein.

In one embodiment, the skinny solar panel 910 determines shading between SPMs and thus their relating heights. In this way, "height profiles" can be estimated. Below, β-events refer to a panel no longer being shaded. For example, when a first of the SPMs moves, a β-event can be triggered to show that other panels are no longer shaded. These shading events can determine relative heights and the order (sequence) of SPMs. FIGS. 10-23 are used to explain this determination in accordance with one embodiment of the present disclosure. Though FIG. 9 depicts the use of a "skinny solar panel" those of skill in the art will recognize that the present disclosure is not so limited and that shading detection and determinations can be based on the output of the solar panels 901A-J themselves, and described in greater detail in U.S. patent application Ser. No. 15/938,718, entitled METHOD AND SYSTEMS FOR DETECTING SHADING FOR SOLAR TRACKERS, filed May 18, 2018 the entire contents of which is incorporated herein by reference.

FIGS. 10-17 show, among other things, how simple trigonometry can be used to determine relative heights (dh) of adjacent solar trackers as depicted in FIG. 1. FIG. 18 shows a simple recursive algorithm for determining relative heights. FIGS. 19-23 show the results of using this algorithm in accordance with one embodiment of the present disclosure.

In different embodiments, a skinny solar panel is the same as or forms part of a photovoltaic that powers an SPC or is a component separate from the photovoltaic that powers an SPC. Thus, photovoltaics different from skinny solar panels can be used in accordance with FIGS. 9-23 to determine relative heights and ordering between SPMs are described herein.

In an embodiment, the logic of a solar tracking system in accordance with the present disclosure is distributed. For example, referring to FIG. 2, a base performance model is generated at SCADA 260 or at a central location coupled to the SCADA 260 over a cloud network. Diffuse adjustments (e.g., gains) are determined at the SCADA 260. Actual target angles for each SPC are determined at the associated SPCs based on the gains.

Using the cloud network, the SCADA 260 is able to receive weather forecasts, share information from the cloud to the NCUs and SPCs in the zone 280, offload computational functionality to remote processing systems, or any combination of these or any other tasks.

Figure 10:
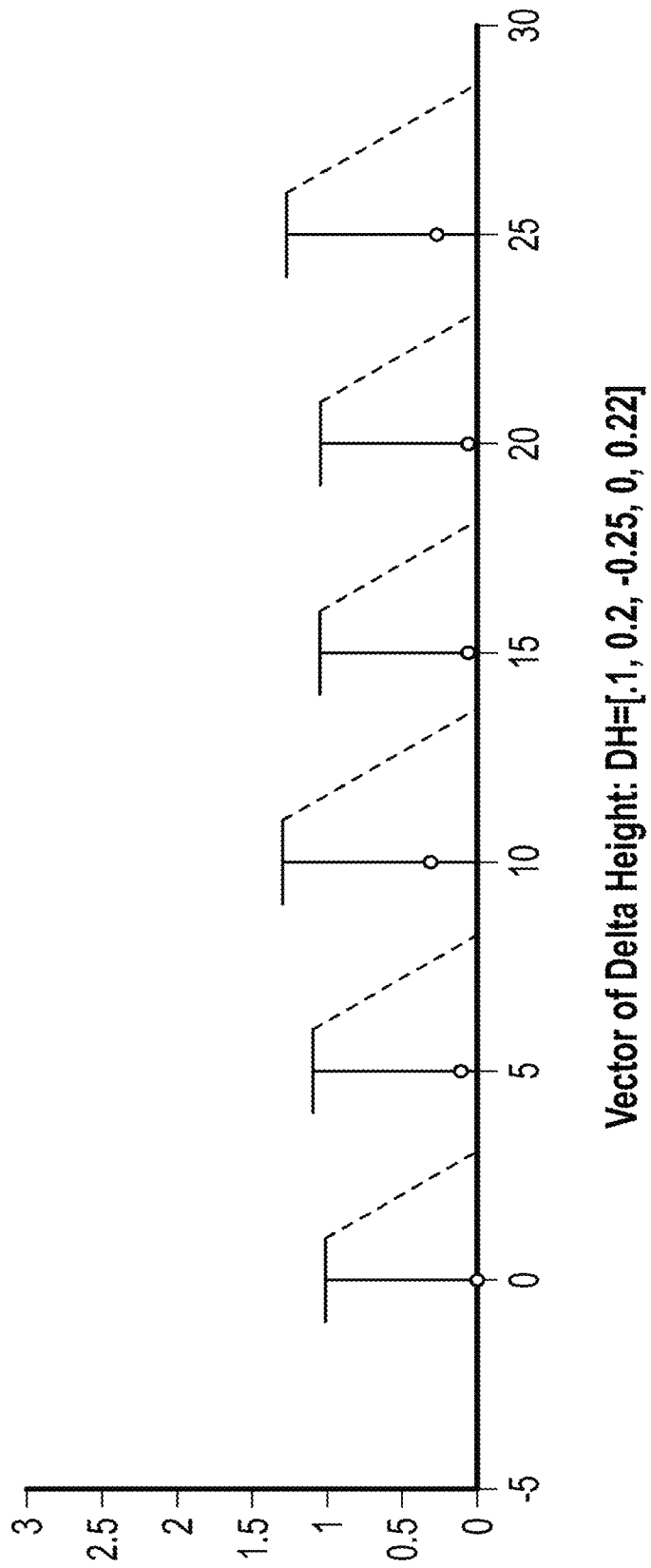

In operation of one embodiment, a global optimal performance model is generated for a solar tracking system in two stages. In the first stage, a detailed site geometry (topography) of the area containing the solar tracking system is determined. This can be determined using laser site surveys, learned surveys using photovoltaics on SPCs, closed-loop readings on the solar panel modules, or airplane or drone imaging. FIG. 10 shows an example of measurement of the delta height (DH) between adjacent solar trackers 110A-110D of FIG. 1. These measurements establish a baseline estimate for the differences in height of the adjacent solar trackers.

Figure 11:
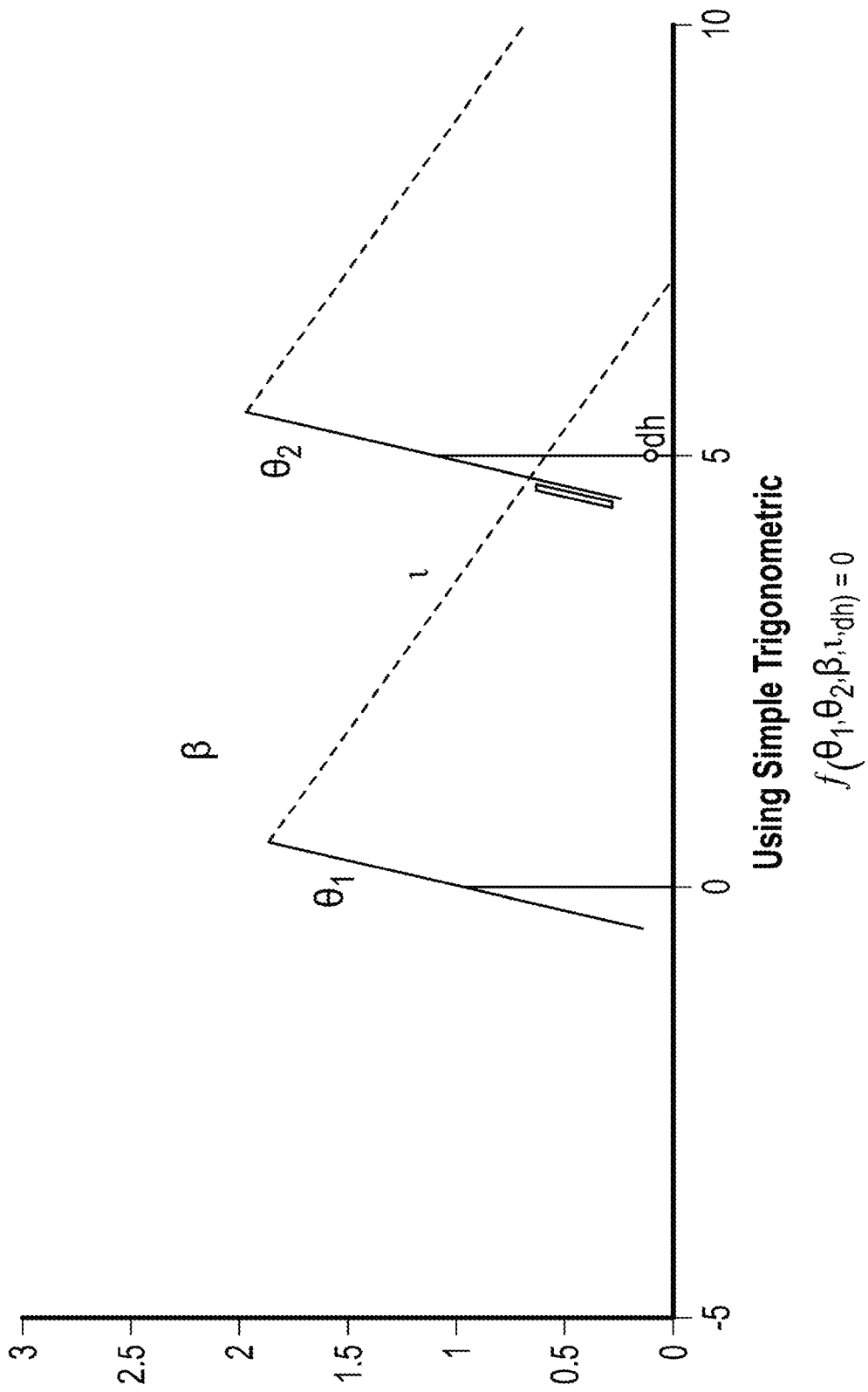
Figure 12:
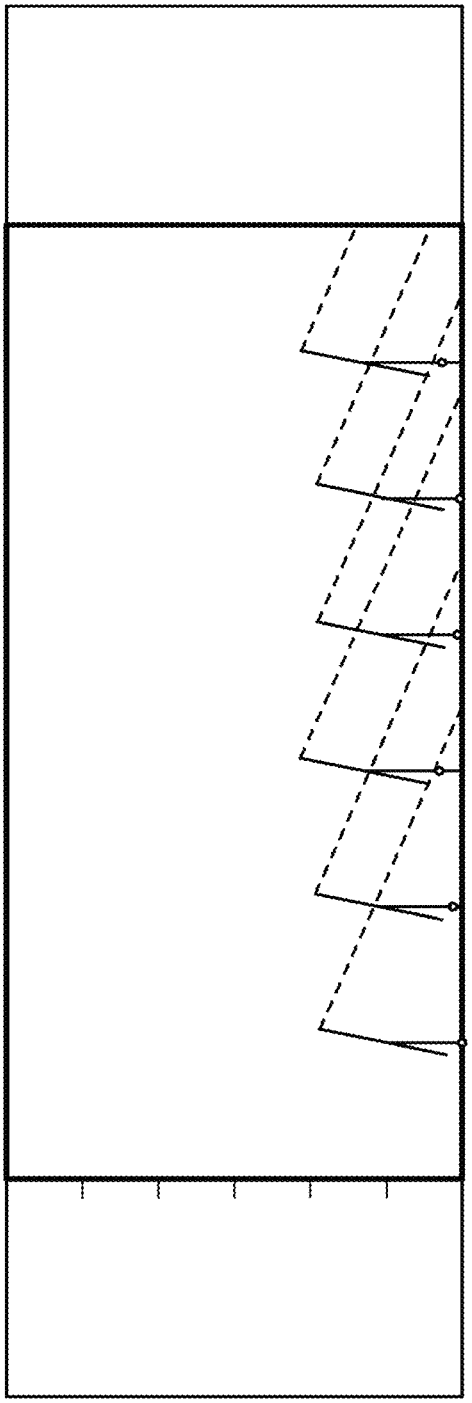
Figure 13:
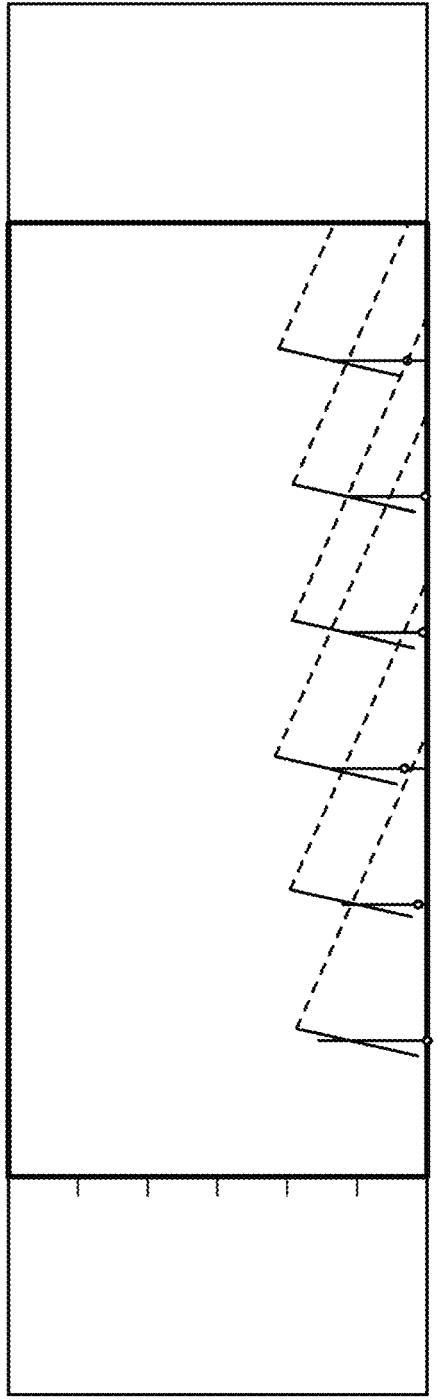
Figure 14:
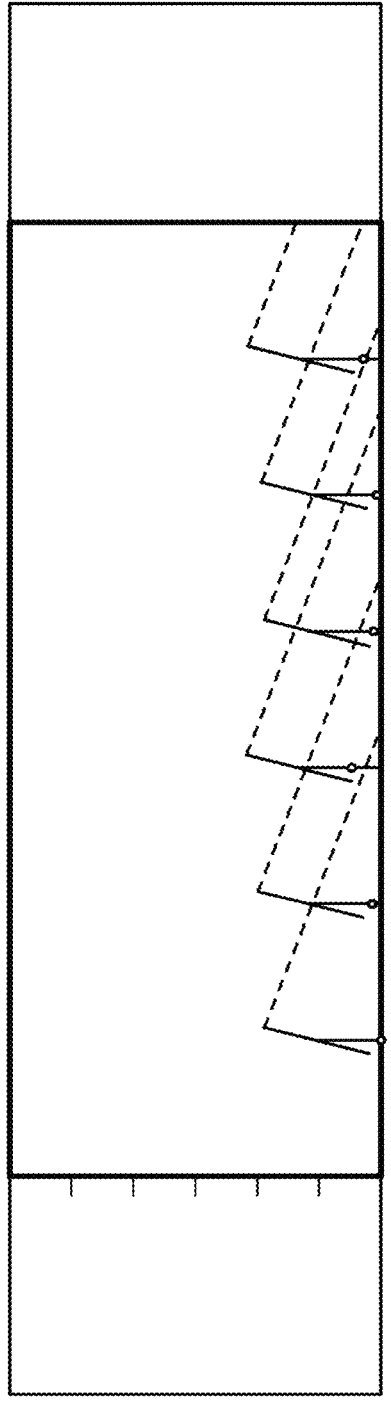
Figure 15:
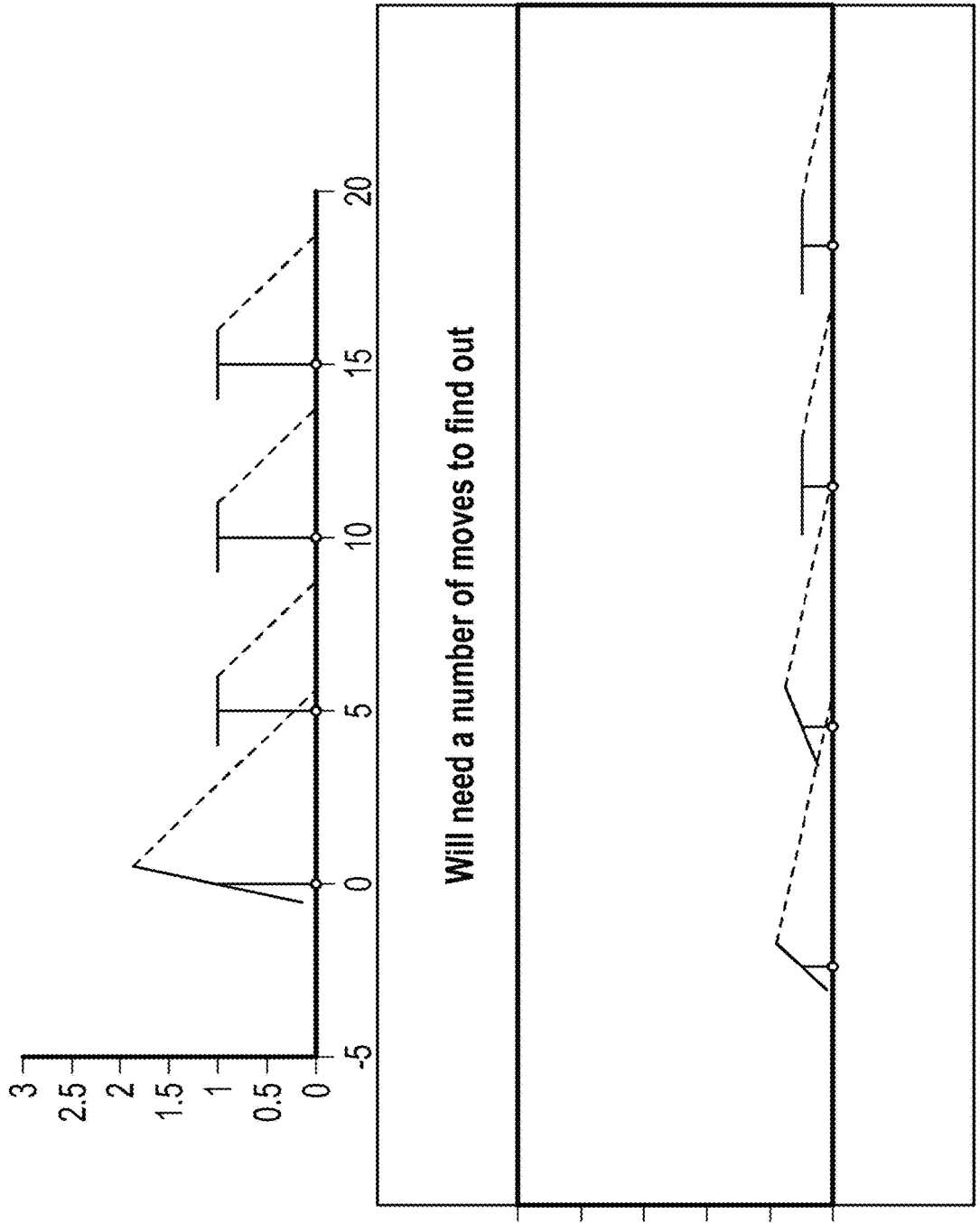
Figure 19:
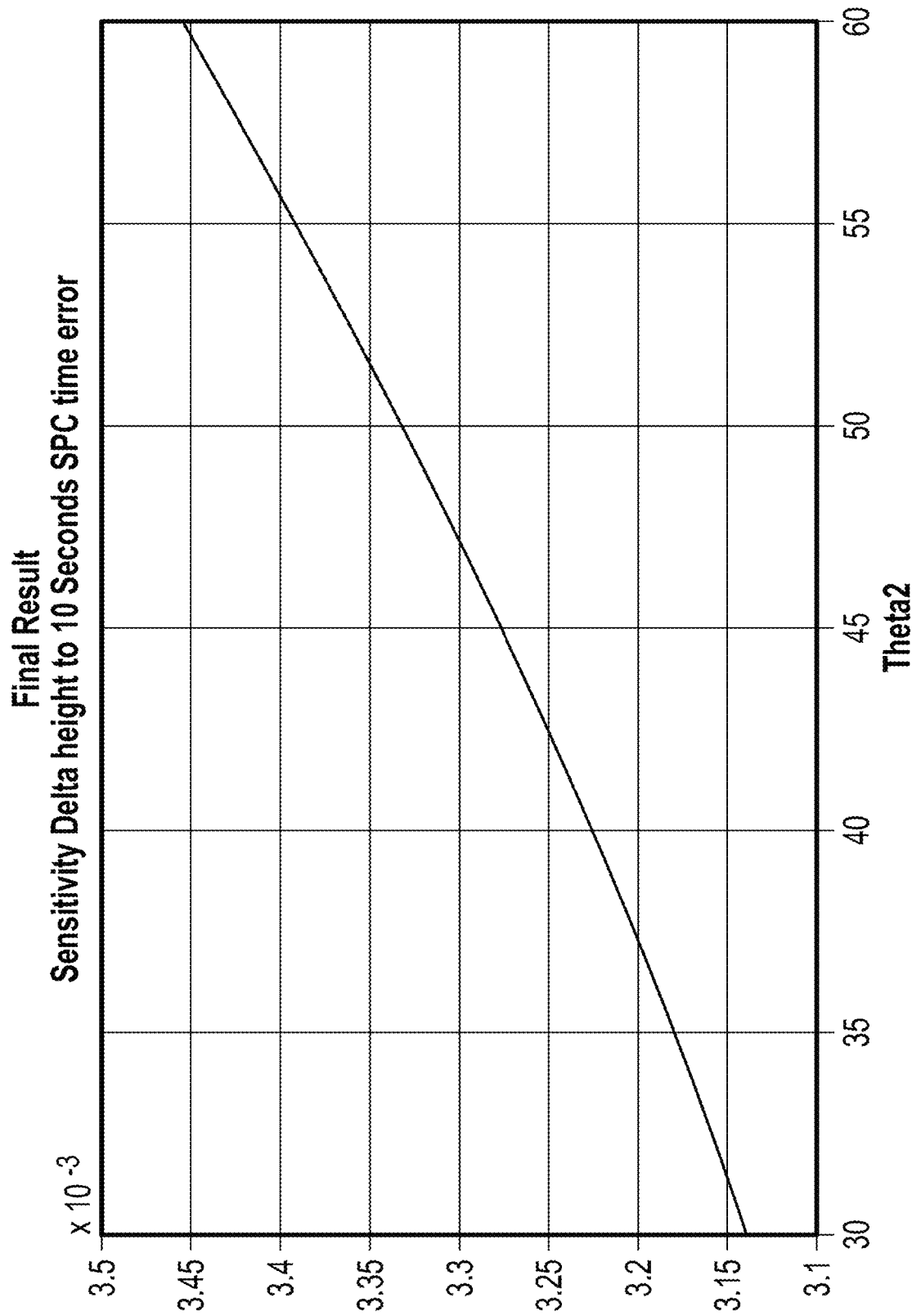

As some examples, topography for the area containing an SPC is determined by orienting a photovoltaic on the SPC to the known location of the sun. The energy readings compared to the known location of the sun can be used to determine a position of the associated solar panel, including any one or more of its x-y-z coordinates relative to a fixed point (i.e., its GPS coordinates) or its grade/slope relative to normal or another fixed angle, to name only a few such coordinates. For example, as depicted in FIG. 11, knowing the angle of the angle of the sun to a particular location and measurement of the amount of shading experienced by a first panels as a result of a panel located between the first panel and the sun, (typically based on power output from the first panel), a calculation can be made as to the DH between the two panels. The two solar panels are oriented in similar ways and their local topographies similarly determined. FIG. 12 depicts this same determination as shown in FIG. 11 for an array of solar trackers (e.g., as shown in FIG. 1). As shown in FIG. 12 the angle of the solar panels at which shading is experienced. This is angle is relative to the 0 position where the solar panel is substantially flat or parallel to the ground. As shown in FIG. 12, solar trackers 2-6 experience shading at between 63 and 60.5 degrees. No angle of shading for solar tracker 1 (the eastern most solar tracker) is recorded as it does not experience shading during a morning DH estimation. Based on this determination of the angle at which each solar tracker experiences shading a first estimate of the DH for each tracker. Generally, these estimates compare well to the original estimate of the DH measured as depicted in FIG. 10. FIG. 13 describes a second determination of a second shading event when the sun as moved to the west (i.e., afternoon). Note the angles recorded in FIG. 13 are all negative, and the solar modules of each solar tracker 1-5 experience shading at between −64 and −69.7 degrees. Again, there is no shading experienced by the solar modules of solar tracker 6 (i.e., the western most solar tracker). Based on this determination of DH a determination of the order in which the solar trackers should be moved to avoid shading of the solar modules of the adjacent solar trackers as depicted in FIG. 14. The result is that at any given time, to avoid a shading situation, the solar trackers can be angled to a variety of different angles as depicted in FIG. 15. FIGS. 16 and 17 depict the process described above being carried out multiple times in order to determine the order of moving the solar trackers to eliminate shading. As will be readily understood, the movement to eliminate shading needs to be balanced with the energy costs associated with moving the solar tracker. In a preferred embodiment, the angle the solar panels on any given solar tracker are to be driven to are known in advance, such that for example at sunrise, the solar trackers are optimally angled to prevent shading, and that they never experience any shading, thus maximizing their continued power output through the day, even if not oriented in the optimum angular orientation to the sun as if there were no shading. FIG. 18 is a software implementation of the processes described above with respect to FIGS. 10-17 that can be run on the SCADA 800, and as data is collected used to update the topography module.

Figure 21:
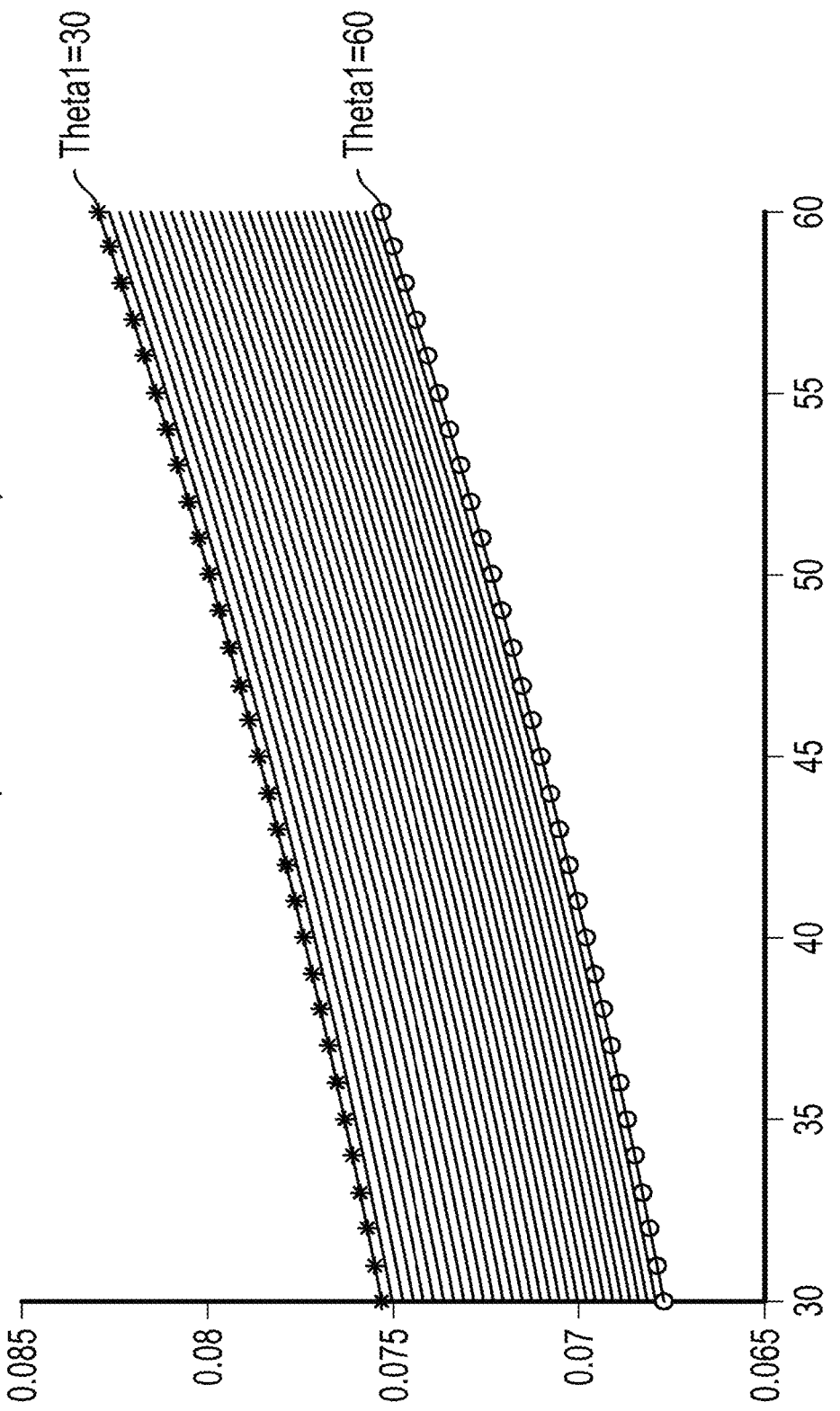
Figure 22:
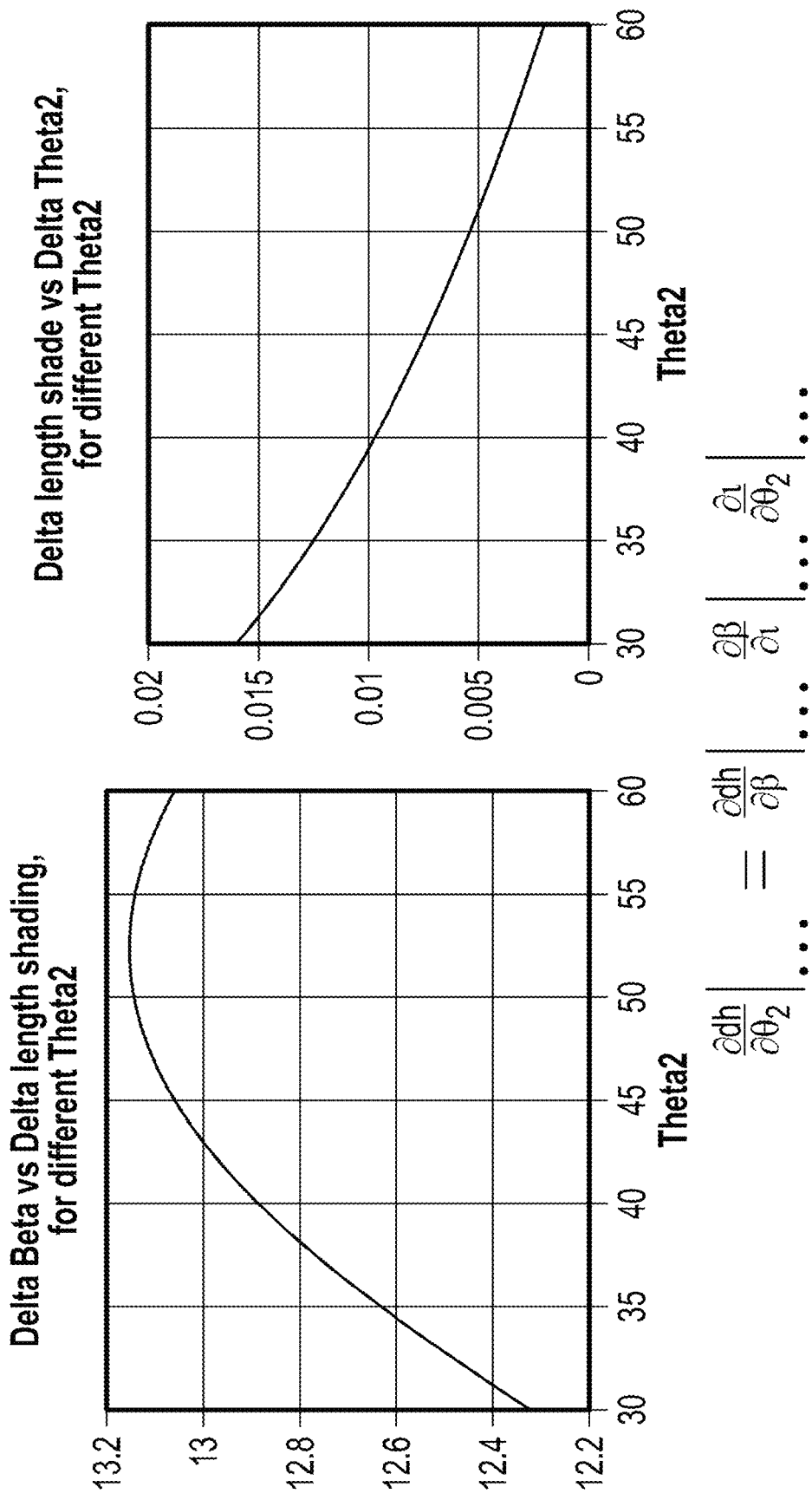
Figure 23:
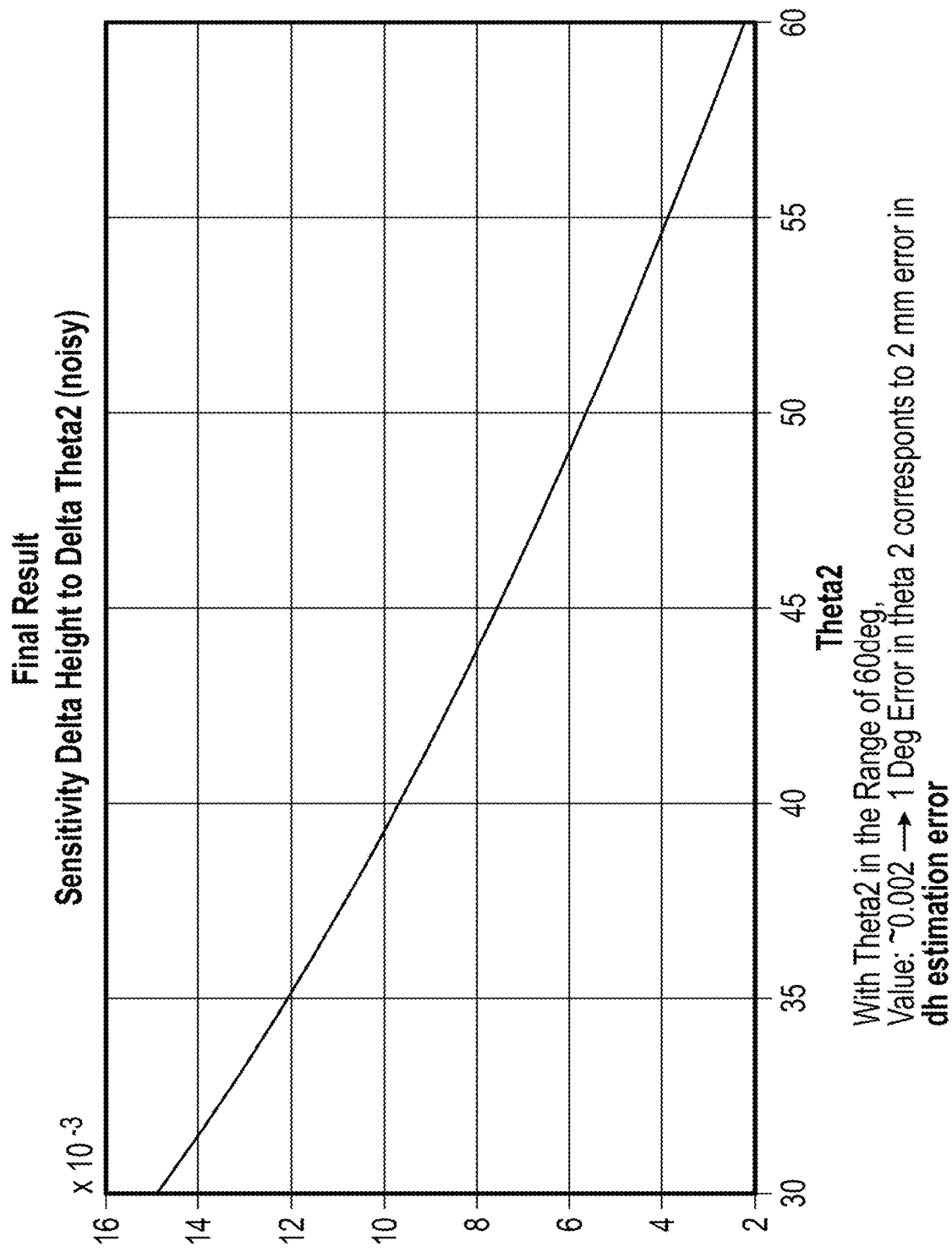

FIGS. 19-23 describe a series of calculations related to error determinations employed by the SCADA 800 based on the angle of the solar tracker at a give time, and the time error of the SPC. As shown in FIG. 20 a correlation is depicted between an error in angle determination and an error in estimating DH. FIG. 21 graphs these errors for different angles of the solar module. FIG. 22 depicts the results of a difference in angle as it results in a difference length in shading of an adjacent solar module. The result as depicted in FIG. 23 is that for angles of the solar module approaching 60 degrees, which are the angles that experience the most shading, the error is significantly reduced.

As noted above, a separate sensing panel may be installed on each row of solar panel modules. By adjusting the orientation of a sensing panel with respect to the sun, based on the time of day (i.e., angle of the sun) and outputs generated on the sensing panel, the relative positions of adjacent rows of solar panel modules can be determined. In still another embodiment, x-y-z coordinates of the edges of the rows of solar panel modules are physically measured.

In a second stage, periodic adjustments are made to the parameters of the performance model, such as by using weather conditions (e.g., forecast and historical conditions), using, for example, satellite weather forecasts, cameras trained to the sky, power measurements on the solar panel modules, and voltage measurement from the SPCs.

Solar grids span large areas, such that different portions of the solar grid experience different weather conditions. In accordance with embodiments of the present disclosure, performance models are generated for each solar panel module and updated based on weather conditions local to each.

A further aspect of the present disclosure is directed to the incorporation of spectral response data of the actual solar cells being employed in a particular installation to optimize the performance model. That is, for any given installation the amount of irradiance is impacted by the spectral response data of the solar modules employed and can impact the calculation of variables such as direct normal irradiance (DNI), global horizontal irradiance (GHI), diffuse horizontal irradiance (DHI), any combination of these that might be used as described hereinabove. Much like temperature and total irradiance, the spectral distribution of irradiance will affect module performance in the field as atmospheric conditions change. The performance effect of spectrum will depend on the material properties of the photovoltaic module technology.

Different photovoltaic technologies have different spectral responses. For example, Cadmium Telluride (CdTe) technology is better responsive to the higher energy/shorter wavelength light (between 350-550 nm). These wavelengths are less affected by the water vapor content in the atmosphere. So, when it is cloudy/humid, a CdTe solar module performs better in comparison to crystalline-silicon modules that is, it has greater external quantum efficiency (EQE). At wavelengths greater than 830 nm, the EQE rapidly drops. This behavior is associated with the bandgap of the CdTe absorber layer. Photons of wavelength greater than 870 nm have energies less than the bandgap energy (approximately 1.44 eV), and therefore are unable to create electron-hole pairs. Such photons do not contribute to the current produced by a CdTe solar module. Also, regardless of water vapor content, when light travels through more Air Mass (AM>2.0 for example), in the early morning or late afternoon hours, shorter wavelength light is less affected by various aerosols in the atmosphere.

The spectral response of the particular solar modules whether they are CdTe modules or monocrystalline silicon modules can be an added factor in establishing the performance models described herein. This data may provide better indication of the irradiance conditions that those provided by generic broadband spectral devices such as pyranometers. In accordance with the present disclosure, the irradiance may be measured using the same underlying technology as is used in a specific installation. Alternatively, the measured irradiance may be spectrally adjusted by modeling the spectral characteristics of the solar module technology in use in the installation. The result is that an installation taking this factor into consideration will capture more useful light for a given photovoltaic technology. Further, different thresholds may be used for triggering diffuse tracking and diffuse offsets based on this additional spectral response data. Further, while CdTe and crystalline solar technologies have been contemplated herein, the present disclosure is not so limited, rather these techniques are applicable to hetero-junction, multi-junction, amorphous silicon, copper Indium Gallium Diselenide (CIGS), and other solar technologies without departing from the scope of the present disclosure.

Figure 24:
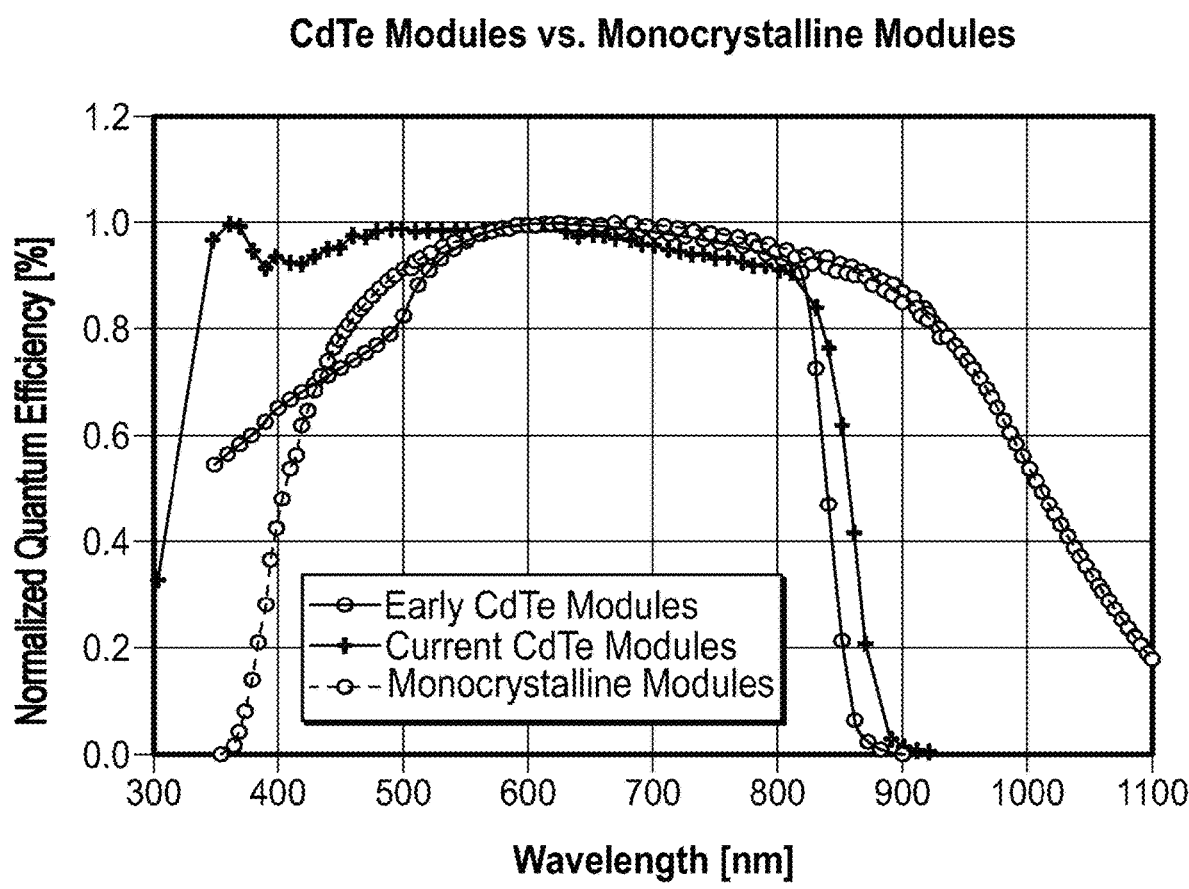
FIG. 24 depicts the quantum efficiency comparison of Cdte solar modules with Monocrystalline solar modules in accordance with an aspect of the present disclosure.

FIG. 24 depicts the quantum efficiency of CdTe solar modules as compared to monocrystalline solar modules over a broad spectrum of light wavelengths. As is apparent, the CdTe solar modules are much more efficient at lower wavelengths of light than monocrystalline, whereas monocrystalline solar modules match the efficiency of CdTe solar cells at about 550 nm but maintain their efficiencies long past the point where CdTe solar modules stop energy absorption.

The spectral responses of technologies described above can have significant impacts on relative energy yield as atmospheric conditions change from the standard ASM G173-03 spectrum. As noted above, different atmospheric constituents (e.g., aerosols) absorb and/or reflect irradiance at different wavelengths, which results in changes in the relative irradiance at each wavelength under field conditions. Significant constituents also include precipitable water (Pwat) and air mass (AM). Thus, there is a need for spectral corrections in photovoltaic performance modeling. Seasonal and short-term weather-related changes in solar spectrum can also cause a shift in the performance of systems and can be incorporated into the modeling of the system.

Utilizing the data for spectral response, either modeled or sampled at a given location, the tracking algorithms described herein can be modified based on the technology of the solar modules to maximize energy harvesting for that technology.

Systems for and methods of generating performance models are disclosed in U.S. patent application Ser. No. 14/577,644, filed Dec. 19, 2014, and titled "Systems for and Methods of Modeling, Step-Testing, and Adaptively Controlling In-Situ Building Components," further, systems for and methods of self-powering solar trackers are disclosed in U.S. patent application Ser. No. 14/972,036, filed Dec. 16, 2015, titled "Self-Powered Solar tracker Apparatus," systems for and methods of row-to-row tracking are disclosed in U.S. patent application Ser. No. 62/492,870, filed May 1, 2017, and titled "Row to Row Sun Tracking Method and System," tracking systems are described in U.S. patent application Ser. No. 14/745,301, filed Jun. 19, 2015, and titled "Clamp Assembly for Solar Tracker," all of which are hereby incorporated by reference.

Those skilled in the art will recognize that various modifications can be made to the disclosed embodiments without departing from the scope of the present disclosure. As one example, while the embodiments disclose multiple rows of solar panel modules, each row can be replaced by a single elongated solar panel module. Further, while the examples describe the radiation source as the sun, other radiation sources are contemplated by the principles of the present disclosure, such as thermal radiation sources.

What is claimed is:

1. A solar tracking system, comprising:
   multiple rows of rotatable solar panel modules forming a grid of solar panel modules, wherein the multiple rows of rotatable solar panel modules are movable relative to a solar source independently of each other; and
   a control system configured to orient each of the multiple rows of solar panel modules to the solar source independently of each other based on a performance model to optimize an energy output from the grid of solar panel modules, wherein the performance model predicts an energy output from the grid of solar panel modules at least based on:
      an orientation of each of the multiple rows of solar panel modules to the solar source;
      weather conditions local to each of the multiple rows of solar panel modules; and
      a spectral response of solar cells of the solar panel modules;
   wherein predicting the energy output from the grid of solar panel modules comprises incorporating spectral response data, the spectral response data being dependent upon the spectral response associated with the solar cells of the solar panel modules and the weather conditions.

2. The solar tracking system of claim 1, wherein the control system orients one or more of the multiple rows of solar panel modules to a position where it generates less than the maximum energy it could in consideration of the instant position of the sun.

3. The solar tracking system of claim 2, wherein the position of the one or more multiple rows of solar panel modules is determined to eliminate shading of the multiple rows of solar panel modules.

4. The solar tracking system of claim 1, wherein thresholds triggering diffuse tracking are calculated at least in part by utilizing the spectral response data.

5. The solar tracking system of claim 1, wherein the control system further includes at least one network control unit (NCU) in wireless communication with at least one of the multiple rows of rotatable solar panel modules.

6. The solar tracking system of claim 1, wherein the control system further includes a plurality of network control units (NCUs) each in wireless communication with at least one of the multiple rows of rotatable solar panel modules, the plurality of NCUs in communication with each other and forming a mesh network.

7. The solar tracking system of claim 1, wherein the control system further includes a plurality of self-powered controllers (SPCs) and a plurality of network control units (NCUs) in wireless communication with each other, the SPCs providing the NCUs real time information regarding shading experienced by the SPCs.

8. The solar tracking system of claim 7, further comprising a remote host, wherein the remote host receives communications from the control system.

9. The solar tracking system of claim 8, wherein the remote host retrieves the weather conditions and generates the performance model.

10. The solar tracking system of claim 9, wherein the performance model is based on one or more of direct normal irradiance (DNI), global horizontal irradiance (GHI), or diffuse horizontal irradiance (DHI).

11. The solar tracking system of claim 9, wherein the performance model is based on the topology of the grid of solar panel modules.

12. The solar tracking system of claim 9, wherein the weather conditions include forecasted weather and instantaneous weather.

13. The solar tracking system of claim 9, wherein the performance model is executed by a Supervisory Control and Data Acquisition (SCADA) device.

14. The solar tracking system of claim 13, wherein the SCADA includes a topology module of the grid of solar panel modules.

15. The solar tracking system of claim 14, wherein the SCADA includes a row-to-row tracking module configured to track slopes of the solar panel modules at their locations.

16. The solar tracking system of claim 15, wherein the row-to-row tracking module is in communication with a diffuse angle adjustor and sends target tracking angles data to the diffuse angle adjustor.

17. The solar tracking system of claim 14, wherein the SCADA includes a DHI (diffuse horizontal irradiance)-GHI (global horizontal irradiance) module.

18. The solar tracking system of claim 17, further comprising a weather look-up module, the weather look-up module in communication with the DHI-GHI module and providing weather data to the DHI-GHI module and a diffuse angle adjustor.

19. The solar tracking system of claim 18, wherein the diffuse angle adjustor is in communication with an SPC.

20. The solar tracking system of claim 14, wherein the SCADA further includes a local sensor data module in communication with an NCU local sensor to provide local sensor data from the grid of solar panel modules.

* * * * *